(12) United States Patent
Mimura et al.

(10) Patent No.: US 11,004,194 B2
(45) Date of Patent: May 11, 2021

(54) INSPECTION DEVICE, IMAGE FORMING APPARATUS, AND INSPECTION METHOD

(71) Applicant: KONICA MINOLTA, INC., Tokyo (JP)

(72) Inventors: Yusuke Mimura, Hino (JP); Makoto Oki, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 89 days.

(21) Appl. No.: 16/542,429

(22) Filed: Aug. 16, 2019

(65) Prior Publication Data

US 2020/0058115 A1 Feb. 20, 2020

(30) Foreign Application Priority Data

Aug. 20, 2018 (JP) .............................. JP2018-153967

(51) Int. Cl.
| | |
|---|---|
| *G06T 7/00* | (2017.01) |
| *G06T 7/13* | (2017.01) |
| *G06K 9/46* | (2006.01) |
| *H04N 1/00* | (2006.01) |
| *G06T 7/11* | (2017.01) |

(52) U.S. Cl.
CPC ............ *G06T 7/001* (2013.01); *G06K 9/4604* (2013.01); *G06T 7/11* (2017.01); *G06T 7/13* (2017.01); *H04N 1/00005* (2013.01); *G06T 2207/10008* (2013.01); *G06T 2207/30144* (2013.01)

(58) Field of Classification Search
CPC ... G06T 7/001; G06T 7/13; G06T 7/11; G06T 2207/10008; G06T 2207/30144; G06K 9/4604; H04N 1/00005; H04N 1/00092; H04N 1/04; G01N 21/95607
See application file for complete search history.

(56) References Cited

FOREIGN PATENT DOCUMENTS

| JP | 2012103225 A | 5/2012 |
|---|---|---|
| JP | 2014055852 A | 3/2014 |
| JP | 2015108522 A | 6/2015 |

*Primary Examiner* — Christopher Wait
(74) *Attorney, Agent, or Firm* — Cantor Colburn LLP

(57) ABSTRACT

An inspection device includes: an image acquirer that acquires an inspection target image; an edge extractor that extracts an edge from each of the inspection target image and a reference image to be used in inspecting the output image; a defect candidate region extractor that extracts a defect candidate region having a possibility of a defect by comparing the inspection target image with the reference image; an edge direction calculator that calculates a direction of the edge in the inspection target image and a direction of the edge in the reference image; and a defect determiner that determines whether the defect candidate region is a defect, on a basis of the direction of the edge in the inspection target image and the direction of the edge in the reference image at a position corresponding to the defect candidate region.

6 Claims, 19 Drawing Sheets

INSPECTION DEVICE, IMAGE FORMING APPARATUS, AND INSPECTION METHOD

CROSS REFERENCE TO RELATED APPLICATION

The present application claims priority under 35 U.S.C. § 119 to Japanese Patent Application No. 2018-153967, filed on Aug. 20, 2018, the entire content of which is incorporated herein by reference.

BACKGROUND

Technological Field

The present invention relates to an inspection device that inspects the print quality of printed matter, an image forming apparatus having an inspection function, and an inspection method.

Description of the Related art

There is a known conventional technology for determining a defect (print defect) in a print piece to inspect the print quality of the print piece, by comparing an inspection target image generated by an image input device such as a scanner reading an image formed on the print piece, with a reference image generated through a rip process performed on the original image of the print piece.

A portion that is particularly problematic in an inspection of an inspection target image is an edge in the inspection target image. An edge is pixels having a great change in the pixel value between the target pixel and a peripheral pixel, or a group of such pixels, and an edge is often an outline of an image such as a print portion. A great change in the pixel value between the target pixel and a peripheral pixel means that the difference between the pixel value of the target pixel and the pixel value of the peripheral pixel is large.

In an edge region or a region near an edge (hereinafter referred to as "the vicinity of an edge"), false detection of a defect is likely to occur due to problems such as "positional displacement", "blurring in the vicinity of an edge", and "chromatic aberration at the time of imaging". Therefore, a conventional inspection device uses a Gaussian filter, an averaging filter, or the like to blur an image (make the change in the pixel value smaller), to prevent false detection of a defect.

JP 2012-103225 A discloses setting of a threshold for determining a defect in an image region other than the background portion, by a method of calculating flatness indicating the change in the pixel value for each image region, setting a low threshold in a high-flatness region, and setting a high threshold in a low-flatness region. Flatness is a scale that indicates the amount of change in pixel value, and an image portion is the region other than the background region. To the human eye, the change in pixel value is small in a region with a high flatness in the image portion, and therefore, a defect is more noticeable than in a region with a low flatness. Therefore, in JP 2012-103225 A, a low threshold is set as the threshold to be compared with a difference between the inspection target image and the reference image in defect determination. On the other hand, a defect in a region with a low flatness is not easily detected by the human eye. Therefore, a high threshold is set so that a defect invisible to the human eye is not erroneously detected.

JP 2014-055852 A discloses a method of extracting an edge in a variable region to prevent false detection in comparing a correct image having variable print data as the master image with a scan image, and setting a higher threshold for determining a defect on the basis of a difference from the inspection target image only in the edge region than in the other regions. Since the characteristics near an edge differ between the correct image created from the variable print data and the inspection target image obtained by scanning an actual output material, false detection occurs when a threshold to be used for comparing scan images with each other is used as in general cases. Therefore, in JP 2014-055852 A, an edge in the variable region is extracted, and a high threshold is set so that false detection will not occur in the region.

JP 2015-108522 A discloses a technique for extracting minute smudges even if there is a gradation region or gradation unevenness. In a gradation region, changes in pixels are not easily detected by the human eye, and therefore, a low threshold for a print difference is set to increase the sensitivity to defects. In such a case, however, the flatness of the region becomes lower, and a high threshold is inevitably set. Likewise, in a case gradation unevenness or the like occurs, the flatness becomes lower. For this reason, in JP 2015-108522 A, relative difference values with surrounding pixels are extracted in each of the inspection target image and the correct image, and the relative difference values in the images are compared between the images. In this manner, a defect is determined.

Meanwhile, a text region or the like is a region in which edges with low flatness exist at a high density, but a defect is noticeable because people pay attention to such a region. Furthermore, the meaning of a letter changes depending on the location of a defect. For example, if there is a smudge between numbers, it looks like a decimal point and changes the value originally represented by those numbers. Therefore, a region including text is a region from which any minute defect should be detected.

By the techniques disclosed in JP 2012-103225 A and JP 2014-055852 A, the threshold for a difference is lowered while the sensitivity is increased in a region with a high flatness (a region in which any edge does not exist), but the threshold for a difference is made higher while the sensitivity is lowered in a region with a low flatness (a region in which an edge exists). Therefore, by the techniques disclosed in JP 2012-103225 A and JP 2014-055852 A, minute smudges existing near edges are not detectable.

According to JP 2015-108522 A, a difference between the inspection target image and the correct image in a certain region corresponding to the inspection region, and a check is made to determine whether the region is a defect, on the basis of the difference value between relative values in the images. However, in a case where the inspection target image includes text, the line width is small, and the line width variation is large. Because of this, the pixel value magnitude relationship between the target pixel and a peripheral pixel changes, and therefore, a defect is not correctly determined by the technique disclosed in JP 2015-108522 A.

Referring now to FIG. 1, the problems with a conventional technology are specifically described. In the case of strokes of letters with a small font size, the magnitude relationship between line widths might vary depending on variation of blurring of images. An inspection target image 500 and a reference image 510 in FIG. 1 each show small letters "n" and "u", and the line widths differ between the letter strokes in frames 501 and 502 in the inspection target image 500, and the letter strokes in frames 511 and 512 in the reference image 510. Furthermore, the difference value between the pixel values of a pixel 503 and a pixel 513 at the same position in the inspection target image 500 and the reference image 510 is 100, but the portion including the pixel 503 is not a defect.

SUMMARY

In view of the above circumstances, there is a demand for a technique for detecting a defect in an edge region in an inspection target image while preventing false detection and a decrease in sensitivity.

To achieve the abovementioned object, according to an aspect of the present invention, an inspection device reflecting one aspect of the present invention comprises: an image acquirer that acquires an inspection target image, the inspection target image being a read image obtained by reading an inspection side of a recording material on which an output image is formed; an edge extractor that extracts an edge from each of the inspection target image and a reference image to be used in inspecting the output image; a defect candidate region extractor that extracts a defect candidate region having a possibility of a defect by comparing the inspection target image with the reference image; an edge direction calculator that calculates a direction of the edge in the inspection target image and a direction of the edge in the reference image; and a defect determiner that determines whether the defect candidate region is a defect, on a basis of the direction of the edge in the inspection target image and the direction of the edge in the reference image at a position corresponding to the defect candidate region.

BRIEF DESCRIPTION OF THE DRAWINGS

The objects, advantages, and features provided by one or more embodiments of the invention will become more fully understood from the detailed description given hereinbelow and the appended drawings which are given by way of illustration only, and thus are not intended as a definition of the limits of the present invention:

FIG. 15A is an inspection target image profile; and FIG. 15B is a reference image profile;

DETAILED DESCRIPTION OF EMBODIMENTS

Figure 1:
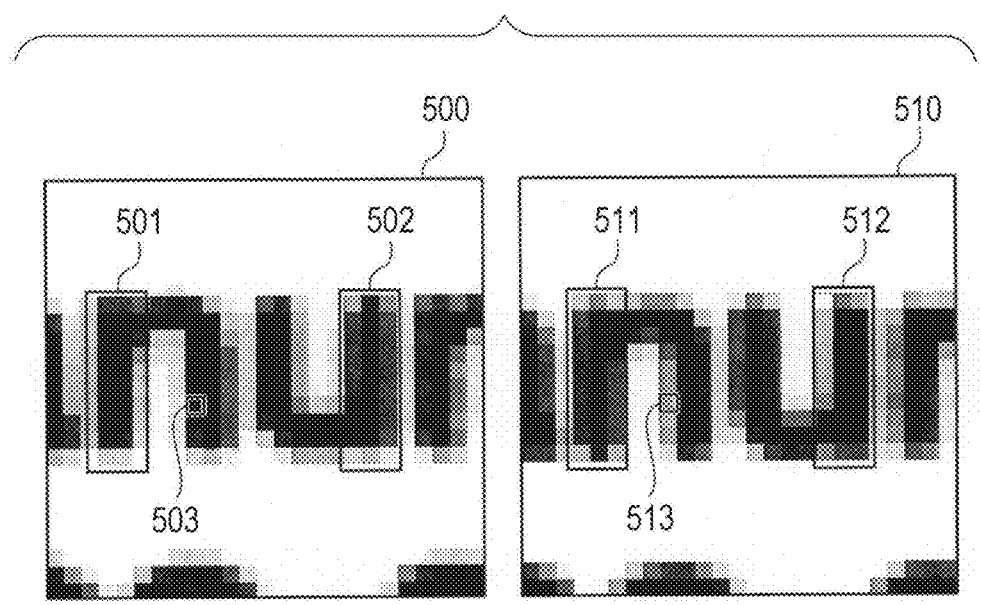
FIG. 1 is a diagram for explaining the problems with a conventional technology.

Hereinafter, one or more embodiments of the present invention will be described with reference to the drawings. However, the scope of the invention is not limited to the disclosed embodiments. In this specification and the accompanying drawings, components having substantially the same functions or structures are denoted by the same reference numerals, and the same explanation is not repeated.

First Embodiment

[Overview of an Inspection System]

Figure 2:
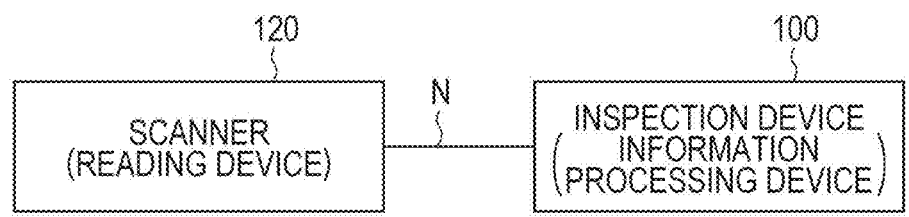
FIG. 2 is a diagram showing an example configuration of an inspection system according to a first embodiment of the present invention.

First, an inspection system according to a first embodiment of the present invention is described. FIG. 2 is a diagram showing an example configuration of an inspection system 1 according to the first embodiment. As shown in FIG. 2, in the inspection system 1, a scanner 120 and an inspection device 100 are connected by a predetermined data transmission path N (a "network cable" or a "serial/parallel cable", for example).

The scanner 120 is a reading device that optically reads the print side of a print piece, and obtains a read image. Meanwhile, the inspection device 100 is an information processing device that inspects the print quality of a print piece. The inspection device 100 may be designed to include the functions of the scanner 120. With this, the user can use a service for inspecting the print quality of a print piece as described below (this service will be hereinafter referred to as the "inspection service").

For example, the user inputs, to the inspection device 100, an image obtained by ripping print data for obtaining a print piece, as a reference image (also referred to as a correct image) in inspecting print quality. The user then uses the scanner 120 to read the print side of the print piece. As a result, the read image is transmitted from the scanner 120 to the inspection device 100. In the inspection device 100, a pixel value difference is detected through a comparison between the received read image and the input reference image, and a defect determination process based on the detected pixel value difference and a set inspection threshold (a defect determination criterion) is performed. Thus, the user can obtain a print quality inspection result.

As described above, in the inspection system 1 according to this embodiment, a printed matter inspection service can be provided by the above described system configuration. In the inspection system 1, a plurality of scanners 120 may be connected to one inspection device 100. With this arrangement, in a case where a large amount of printed matter such as commercial printing is inspected, a plurality of print pieces is read by the plurality of scanners 120 in the same manner as above, and a defect determination process is performed in parallel in the inspection device 100. Thus, printed quality inspection can be efficiently conducted.

<Hardware Configuration of the Inspection Device>

Figure 3:
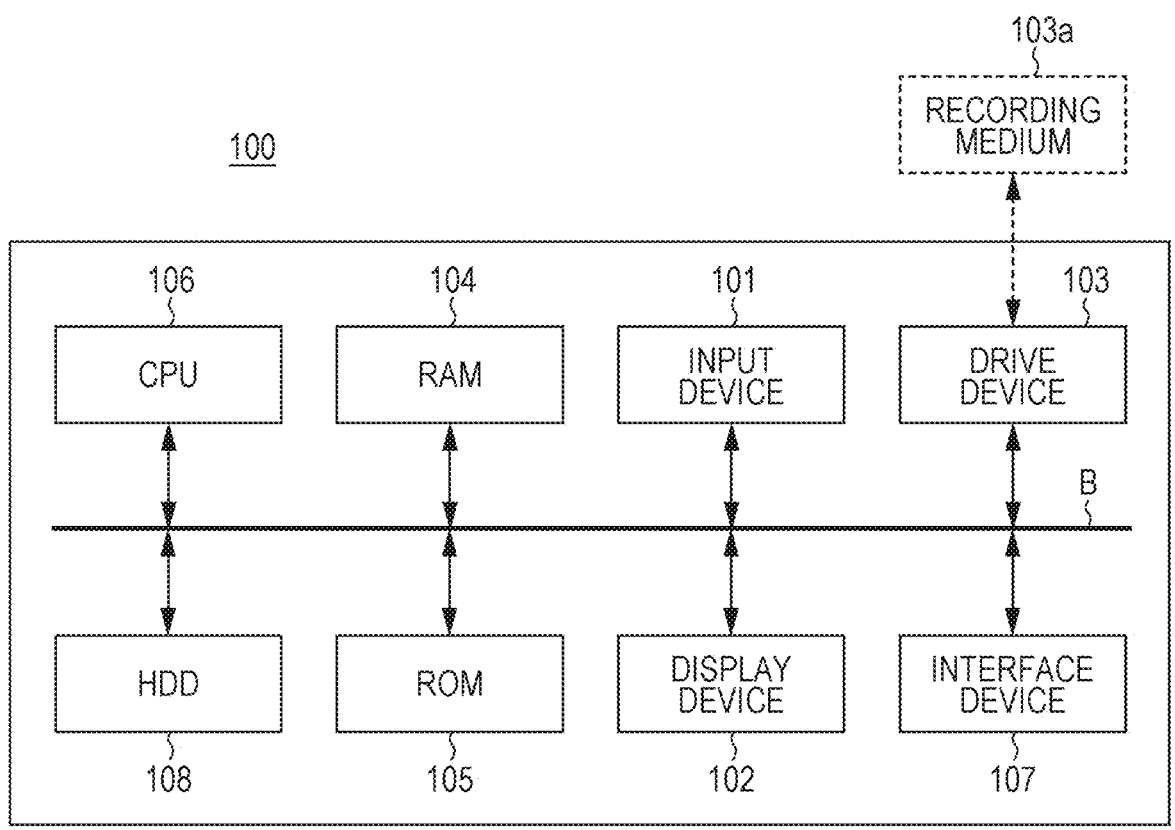
FIG. 3 is a block diagram showing an example hardware configuration of an inspection device according to the first embodiment of the present invention.

FIG. 3 is a block diagram showing an example hardware configuration of the inspection device 100. As shown in FIG. 3, the inspection device 100 includes an input device 101, a display device 102, a drive device 103, a random access memory (RAM) 104, a read only memory (ROM) 105, a central processing unit (CPU) 106, an interface device 107, and a hard disk drive (HDD) 108, which are connected to one another by a bus B.

The input device 101 includes a keyboard, a mouse, and the like, and is used for inputting respective operation signals to the inspection device 100. The display device 102 includes a display and the like, and displays a processing result obtained by the inspection device 100. The interface device 107 is an interface that connects the inspection device 100 to the data transmission path N. With this configuration, the inspection device 100 can perform data communication with another device that includes a scanner 120 and has a communication function, via the interface device 107.

The HDD 108 is a nonvolatile storage device storing programs and data. The stored programs and data include an operating system (OS) that is basic software such as an information processing system ("Windows (registered trademark)" or "UNIX (registered trademark)", for example) that controls the entire inspection device 100, and applications or the like for providing various functions (an "inspection function", for example) in the system.

The HDD 108 also manages the stored programs and data with a predetermined file system and/or a database (DB). The drive device 103 is an interface with a removable recording medium 103a. With this configuration, the inspection device 100 can perform reading and/or writing on the recording medium 103a via the drive device 103. The recording medium 103a may be a floppy (registered trademark) disk, a compact Disk (CD), a digital versatile disk (DVD), an SD memory card, a universal serial bus (USB) memory, or the like, for example.

The ROM 105 is a non-volatile semiconductor memory (storage device) capable of holding internal data even when the power is turned off. The ROM 105 stores programs and data to be executed at a time of activation of the inspection device 100, such as a Basic Input/Output System (BIOS), information processing system settings, and network settings. The RAM 104 is a volatile semiconductor memory (storage device) that temporarily holds programs and data. The CPU 106 is an arithmetic device that realizes control and installation functions of the entire inspection device 100, by reading programs and data from the storage device (the "HDD" or the "ROM", for example) into the RAM 104 and performing processes. As described above, the inspection device 100 according to this embodiment can provide the above inspection service, having the above hardware configuration.

[Configuration of the Inspection Function]

Figure 4:
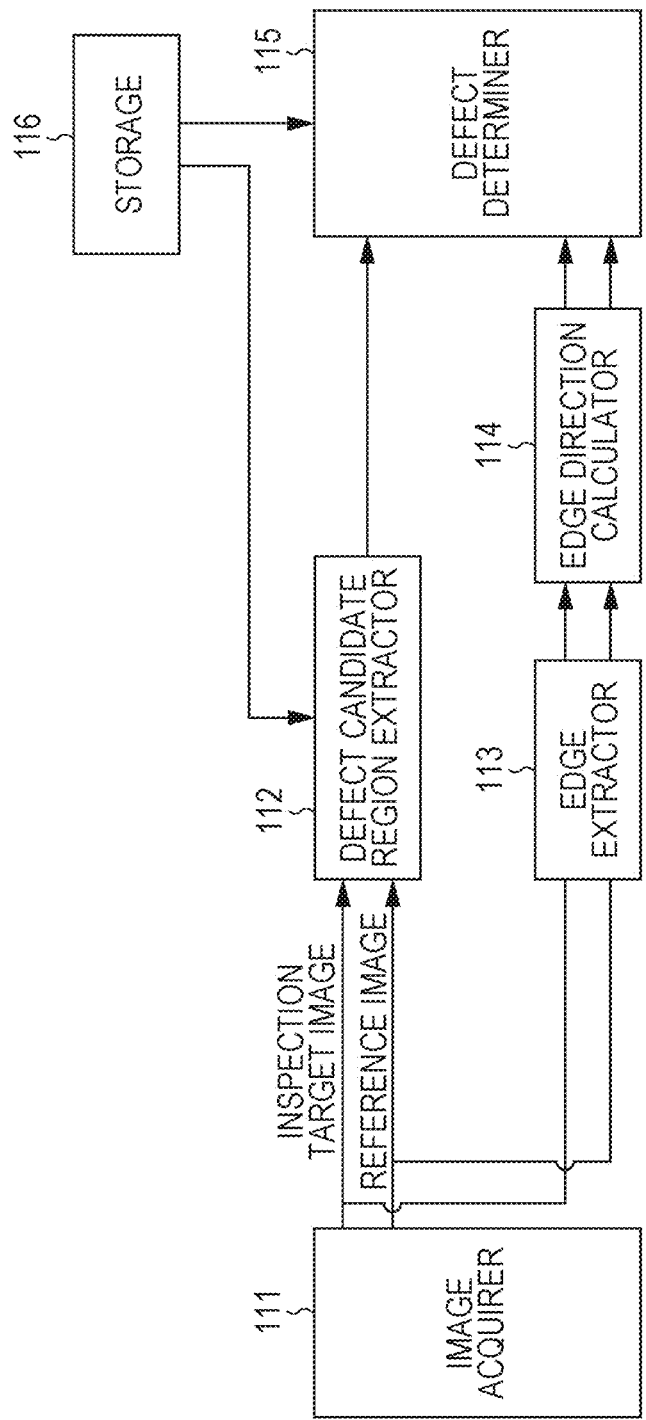
FIG. 4 is a block diagram showing an example configuration of an inspection function of the inspection device according to the first embodiment of the present invention.

FIG. 4 is a block diagram showing an example configuration of the inspection function of the inspection device 100. The inspection device 100 includes an image acquirer 111, a defect candidate region extractor 112, an edge extractor 113, an edge direction calculator 114, a defect determiner 115, and a storage 116. Each of these functions is realized by the CPU 106 executing a program stored in the ROM 105.

The image acquirer 111 performs a process of acquiring a read image obtained by reading an inspection side of a print piece on which an output image is formed in accordance with document image data or the like, as an inspection target image. The image acquirer 111 may also acquire a reference image to be used for inspecting an output image. The reference image may be generated by performing a rip process on document image data, or may be generated by reading a defect-free output image that has been output earlier. Alternatively, the reference image may be stored in the storage 116 in advance, if the reference image is to be used repeated.

The defect candidate region extractor 112 performs a process of comparing the inspection target image acquired by the image acquirer 111 with the reference image, and extracting a region that has a large difference between the inspection target image and the reference image and has a possibility of a defect (this region is called a defect candidate region). More specifically, the defect candidate region extractor 112 compares the inspection target image with the reference image to detect pixel value differences (a difference image) between the pixels located in the corresponding positions in the two images, and extracts each pixel in the difference image having a greater pixel value than the set inspection threshold as a defect candidate region. The inspection threshold is stored in the storage 116. The storage 116 is equivalent to the ROM 105 or the HDD 108.

The edge extractor 113 performs a process of extracting an edge from each of the inspection target image acquired by the image acquirer 111 and the reference image. The edge direction calculator 114 calculates the direction of the gradient of the edge in the inspection target image and the direction of the gradient of the edge in the reference image, the edges having been extracted by the edge extractor 113. The direction of an edge gradient is the direction in which the rate of change in the pixel value (the gradient of the pixel value distribution) is the highest at the current target pixel in the edge region. Hereinafter, the direction of an edge gradient is referred to as an "edge direction". The edge direction calculator 114 may calculate only the direction of the gradient of the edge at the position corresponding to each of defect candidate regions of the inspection target image and the reference image. In this manner, the processing load on the edge direction calculator 114 is reduced, and the time until the calculation of the gradient directions of all the edges is completed can be shortened.

The defect determiner 115 performs a process of comparing the direction of the edge in the inspection target image with the direction of the edge in the reference image at the position corresponding to the defect candidate region, and determining whether the defect candidate region is a true defect. More specifically, with respect to the defect candidate region, the defect determiner 115 calculates the value of the difference between the direction of the edge in the inspection target image and the direction of the edge in the reference image, determines the defect candidate region to be a defect when the value of the difference between the directions of both edges is equal to or greater than a first threshold, and determines the defect candidate region to be normal when the value of the difference is smaller than the first threshold. In a case where a defect inspection region is determined to be normal, the defect inspection region is considered to a region generated due to misalignment or image blurring. The first threshold is stored in the storage 116.

(Edge Direction)

Figure 5:
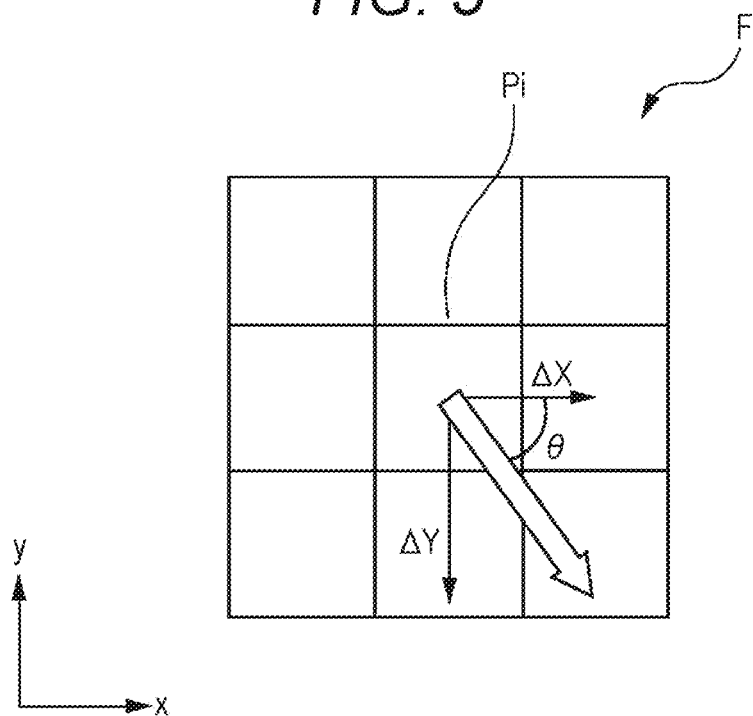
FIG. 5 is a diagram for explaining an edge direction according to the first embodiment of the present invention.

A method of calculating an edge direction in the edge direction calculator 114 is now described. FIG. 5 is a diagram for explaining an edge direction according to the first embodiment. The lateral direction of an inspection target image is the x-direction, and the direction perpendicular to the x-direction is the y-direction.

The edge extractor 113 applies a contour detection filter F to each pixel in the processing target image, to extract an edge present in the processing target image. The contour detection filter F may be a 3×3 Sobel filter or the like that is resistant to noise, for example. A Sobel filter is an improved version of a Prewitt filter, and is a filter that combines a smoothing filter and a differential filter, and weights the pixel values of peripheral pixels in accordance with the distances between the peripheral pixels and a target pixel Pi.

The direction of an edge is the direction of a vector (a synthesized vector) obtained by combining a vector indicating an x-direction edge and a vector indicating a y-direction edge, and is represented by an angle from the x-direction of the synthesized vector as shown in Expression (1). That is, the direction θ of an edge can be determined using an arctangent, from the magnitude of the gradient (rate of change in pixel value) of the x-direction edge and the magnitude of the gradient of the y-direction edge. The first threshold that is for edge directions and is to be used by the defect determiner 115 is preferably determined in consideration of image blurring and the like at the scanner 120, for example.

$$\theta = \tan^{-1}(\text{magnitude of gradient of } y\text{-direction edge}/\text{magnitude of gradient of } x\text{-direction edge}) \quad (1)$$

Figure 6:
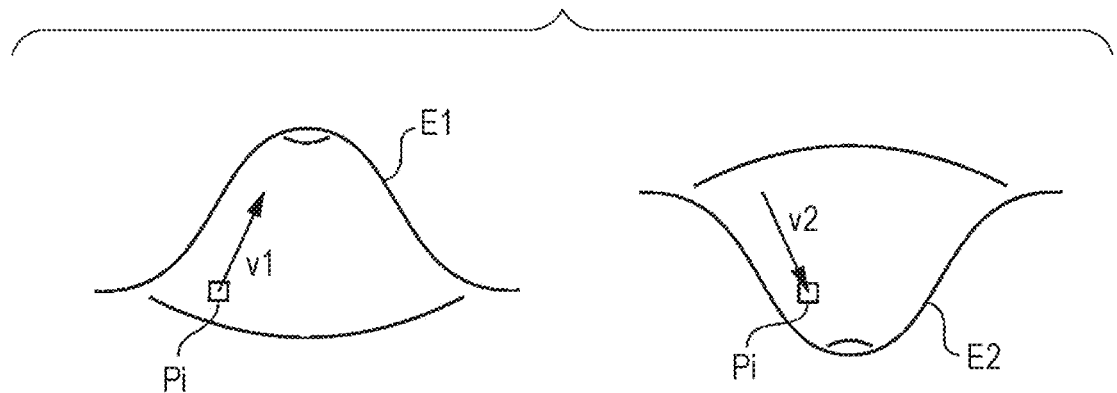
FIG. 6 is a diagram for explaining edge gradients according to the first embodiment of the present invention.

The meaning of an arrow that represents the gradient of an edge is now explained. FIG. 6 is a diagram for explaining the gradients of edges. FIG. 6 shows pixel value distributions in which the pixel values of respective pixels are plotted in a direction perpendicular to the x-y plane. On the left side in FIG. 6, a directional vector v1 starting from a target pixel Pi is shown on the slope of a convex pixel value distribution E1. The pixel value of a peripheral pixel at the end point side of the directional vector v1 is greater than the pixel value of the target pixel Pi. That is, the directional vector v1 extending from the target pixel Pi toward the periphery shows an ascending slope, and the target pixel Pi is located in the middle or at the foot of the mountain slope (an upward slope) formed by the pixel value distribution E1.

On the other hand, on the right side in FIG. 6, a directional vector v2 having the target pixel Pi as its end point is shown on the slope of a concave pixel value distribution E2. The pixel value of a peripheral pixel at the start point side of the directional vector v2 is greater than the pixel value of the target pixel Pi. That is, the directional vector v2 extending from the periphery toward the target pixel Pi shows a descending slope, and the target pixel Pi is located in the middle or at the bottom of the slope (a downward slope) of a valley formed by the pixel value distribution E2.

The directional vector (the synthesized vector in FIG. 5) may be regarded as a vector whose magnitude is represented by the value of the rate of change in the direction in which the rate of change in pixel value (the gradient of the pixel value distribution) is the highest at the target pixel Pi.

[Inspection Process According to a Conventional Technology]

Figure 7:
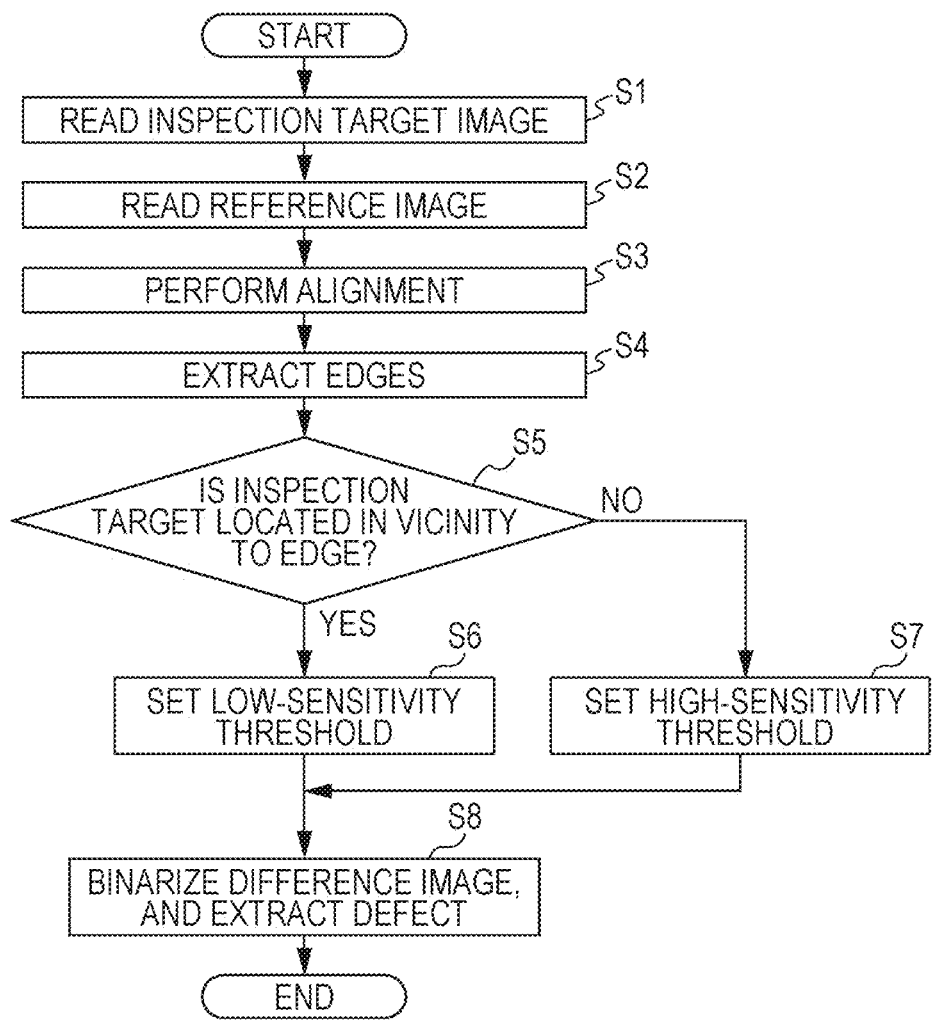
FIG. 7 is a flowchart showing exemplary procedures in an inspection process according to a conventional technology.

To clarify the differences from the procedures in an inspection process according to the first embodiment, exemplary procedures in an inspection process according to a conventional technology are now described. FIG. 7 is a flowchart showing exemplary procedures in an inspection process according to a conventional technology.

In the conventional technology, an image acquirer in an inspection device first reads an inspection target image that is a read image obtained by reading the inspection side of a print piece on which an output image is formed (S1), and also reads the reference image to be used in inspecting the output image (S2). An alignment processing unit then aligns the inspection target image with the reference image (S3). Further, the edge extractor extracts respective edges from the inspection target image and the reference image, and outputs the extraction result to the defect determiner (S4).

The defect determiner then performs a process of determining whether the inspection target in the inspection target image is located in the vicinity of an edge (or includes an edge) (S5), and sets the threshold to be used in step S8, in accordance with the determination result. If the defect determiner determines that the inspection target is located in the vicinity of an edge (YES in S5), the defect determiner sets a low-sensitivity threshold (S6). If the defect determiner determines that the inspection target is not located in the vicinity of an edge (NO in S5), the defect determiner sets a high-sensitivity threshold (S7).

After the processing in step S6 or S7, the defect determiner compares the aligned inspection target image with the reference image, and detects differences (a difference image) between the respective pixel values of the pixels located at the corresponding positions in the two images. The defect determiner then binarizes the pixel values of the respective pixels in the difference image using the set inspection threshold, and extracts the respective binarized pixels in the difference image as a defect (S8). The extracted defect is then output to a display device or the like, and the inspection process comes to an end.

[Inspection Process According to the First Embodiment]

Figure 8:
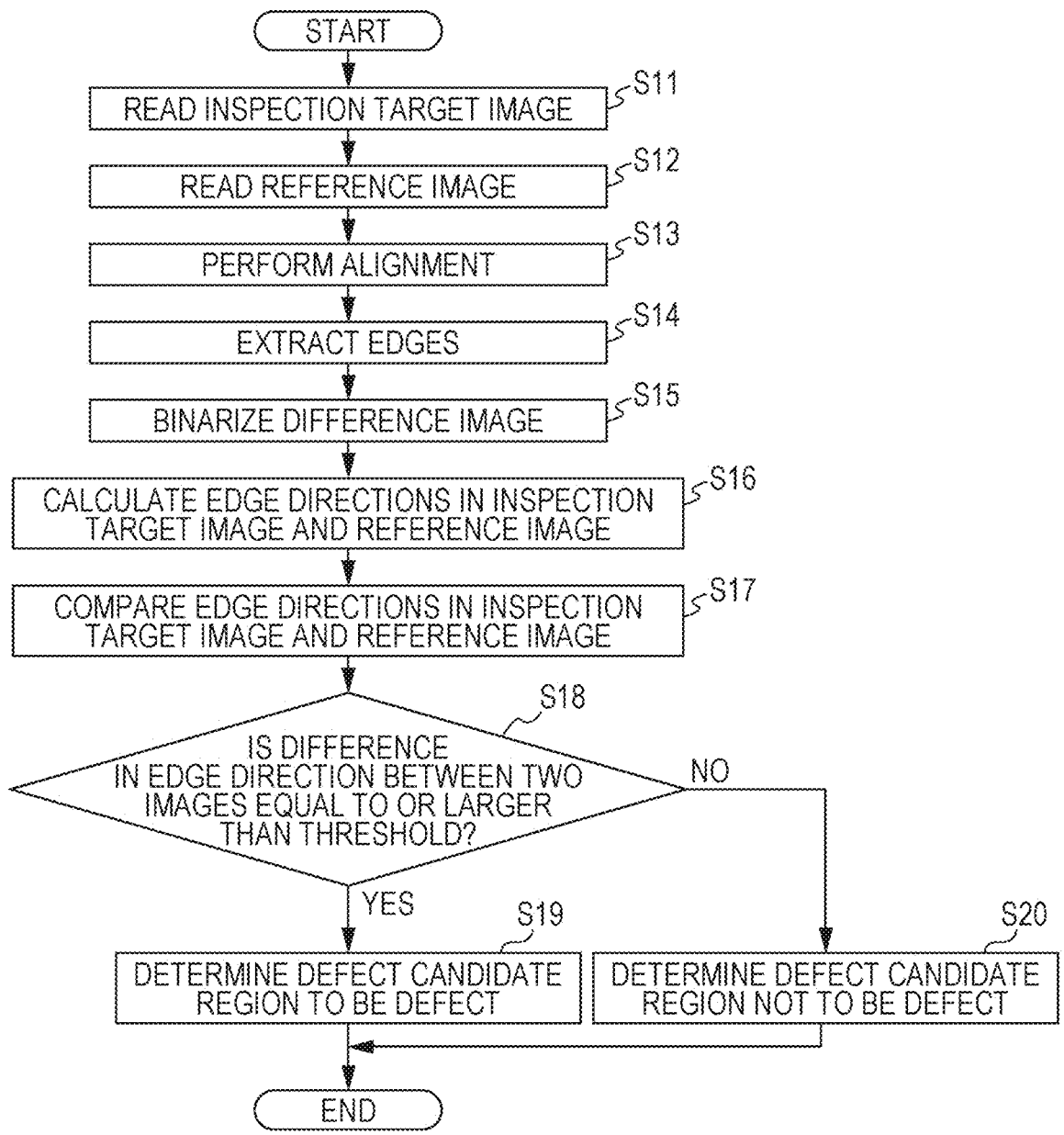
FIG. 8 is a flowchart showing exemplary procedures in an inspection process according to the first embodiment of the present invention.

Next, exemplary procedures in an inspection process according to the first embodiment are described. FIG. 8 is a flowchart showing exemplary procedures in an inspection process according to the first embodiment. The CPU 106 executes a program stored in the ROM 105, to perform the inspection process shown in FIG. 8. Note that steps S11 through S14 in the inspection process shown in FIG. 8 are the same as steps S1 through S4 in the procedures in the inspection process according to the conventional technology shown in FIG. 7.

First, the image acquirer 111 in the inspection device 100 reads an inspection target image that is a read image obtained by reading the inspection side of a print piece (S11), and also reads the reference image to be used in inspecting an output image (S12). The defect candidate region extractor 112 then aligns the inspection target image with the reference image (S13). Further, the edge extractor 113 extracts respective edges from the inspection target image and the reference image, and outputs the extraction result to the edge direction calculator 114 (S14). The order of the procedures in steps S13 and S14 can be switched.

The defect candidate region extractor 112 then compares the aligned inspection target image with the reference image to detect pixel value differences (a difference image) between the pixels located in the corresponding positions in the two images, and binarizes the pixel values of the respective pixels in the difference image, using the inspection threshold set beforehand in the storage 116 (S15).

The edge direction calculator 114 then calculates the directions of the respective edges in the inspection target image and the reference image at the positions corresponding to the defect candidate region, and outputs information about the calculated edge directions to the defect determiner 115 (S16). The defect determiner 115 then compares the edge directions in the inspection target image and the reference image with each other (S17), and determines whether the value of the difference in edge direction (a displacement angle) between the two images is equal to or greater than the first threshold (S18).

If the value of the difference in the edge direction between the inspection target image and the reference image is equal to or greater than the first threshold (YES in S18), the defect determiner 115 determines that the defect candidate region is a defect (S19). If the value of the difference in the edge direction between the two images is smaller than the first threshold (NO in S18), on the other hand, the defect determiner 115 determines that the defect candidate region is not a defect (S20). After the procedure in step S19 or S20 is completed, the inspection process comes to an end. The defect determiner 115 performs the above defect determination on all the defect candidate regions in the screen obtained as a result of the binarization, and outputs information about the image and the position of each defect candidate region determined to be a defect.

[Example of a Determination Result]

Figure 9:
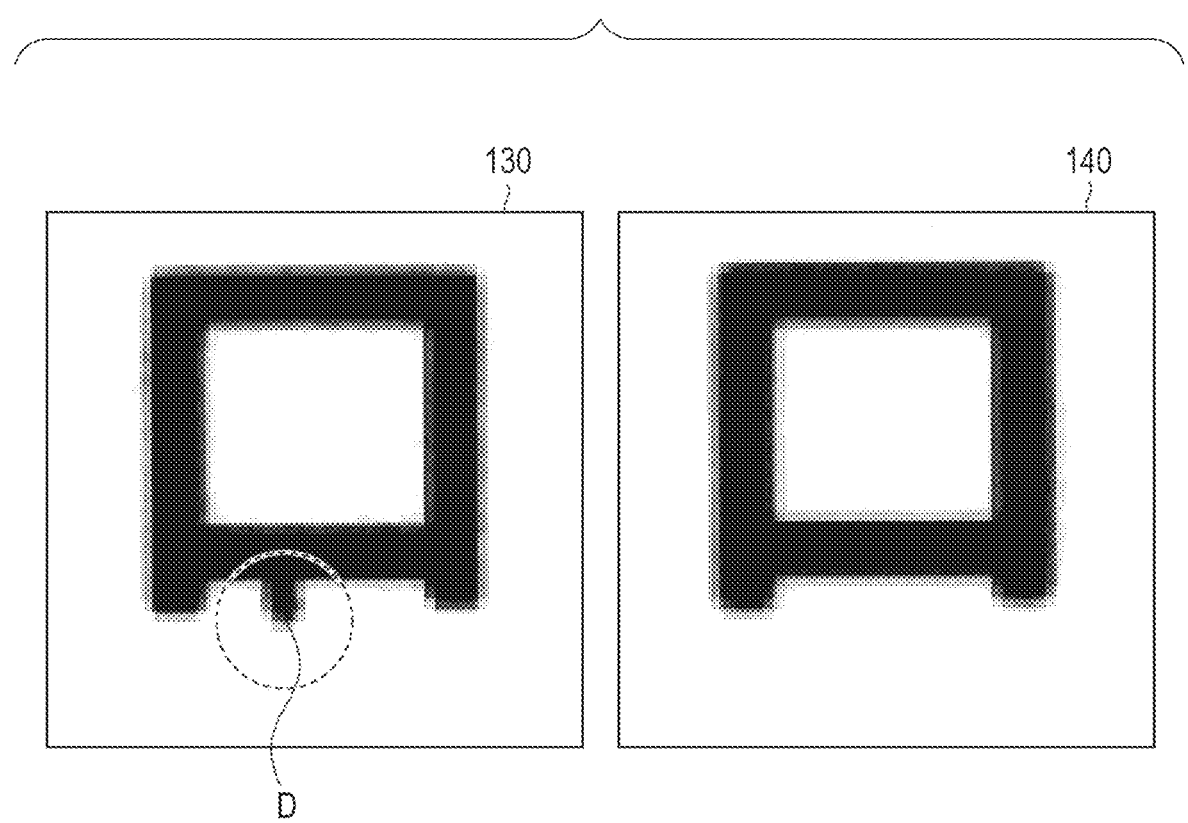
FIG. 9 is a diagram showing an example of an inspection target image and a reference image.
Figure 10:
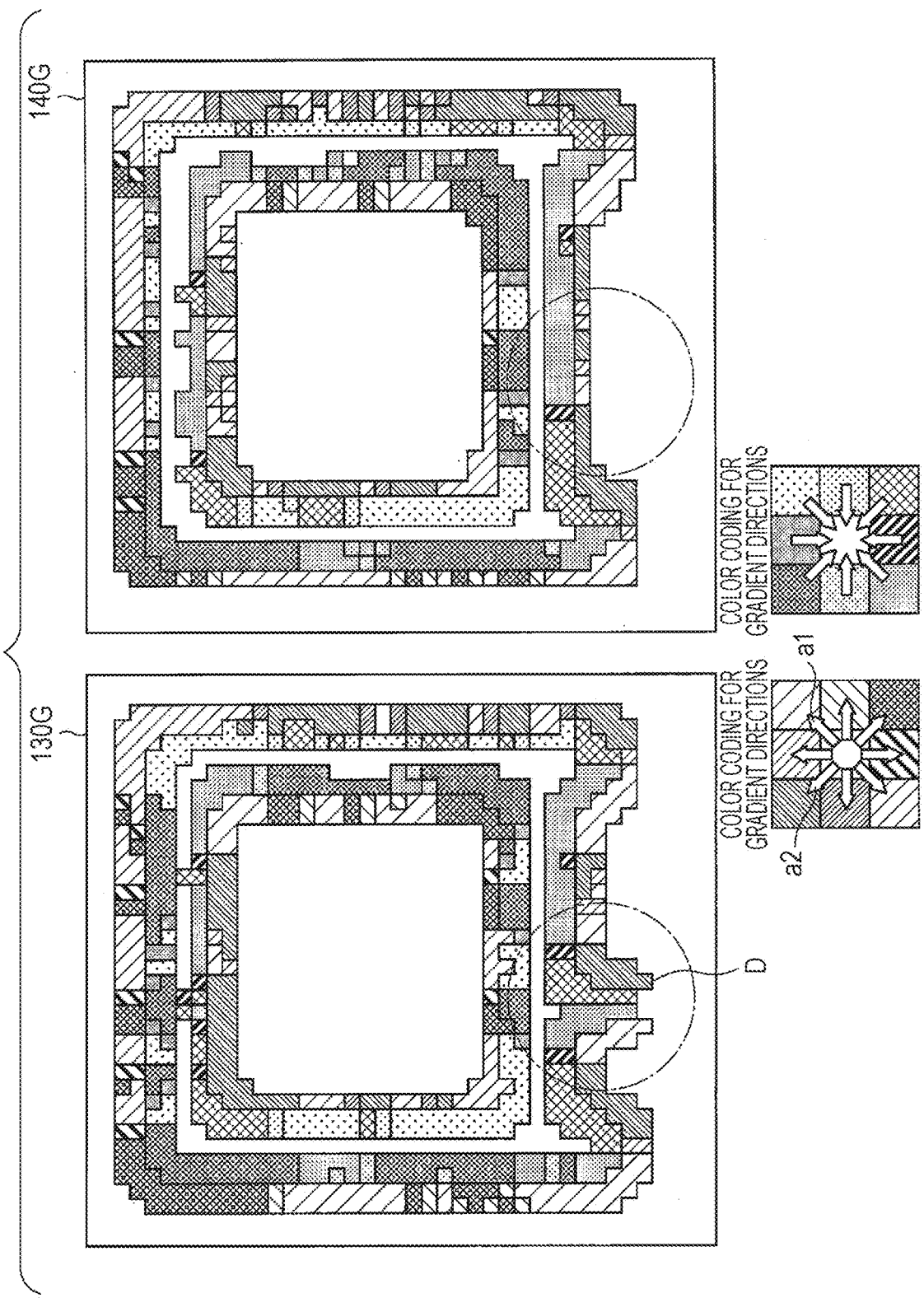
FIG. 10 is a diagram in which the directions of edges having magnitudes equal to or greater than a predetermined gradient in an inspection target image and a reference image are color-coded.

The inventors checked how the directions (gradient directions) of edges near a defect would change in an inspection target image and a correct image, when there was a defect in a print piece. In the description below, an example result of determination as to an inspection target image is described. FIG. 9 is a diagram showing an example of an inspection target image and a reference image. FIG. 10 is a diagram in which the directions of edges having magnitudes equal to or greater than a predetermined gradient in an inspection target image and a reference image are color-coded. In actual measurement results, the directions of edges are classified by colors. In FIG. 10, however, the directions of edges are classified by pattern differences.

In an inspection target image 130 and a reference image 140 shown in FIG. 9, the Chinese character meaning "mouth" is shown. In the inspection target image 130, a defect region D (within the portion indicated by a dashed line) exists on the lower horizontal stroke of the Chinese character meaning "mouth" as indicated by the dashed line. In the description below, attention will be drawn to the defect region D in the explanation of the directions of edges.

An inspection target image 130G shown in FIG. 10 is a result of an edge extraction process and an edge direction calculation process performed on the inspection target image 130 shown in FIG. 9. Likewise, a reference image 140G is a result of an edge extraction process and an edge direction calculation process performed on the reference image 140 shown in FIG. 9. Edge directions (gradient directions) are displayed in the inspection target image 130G and the reference image 140G.

Figure 11:
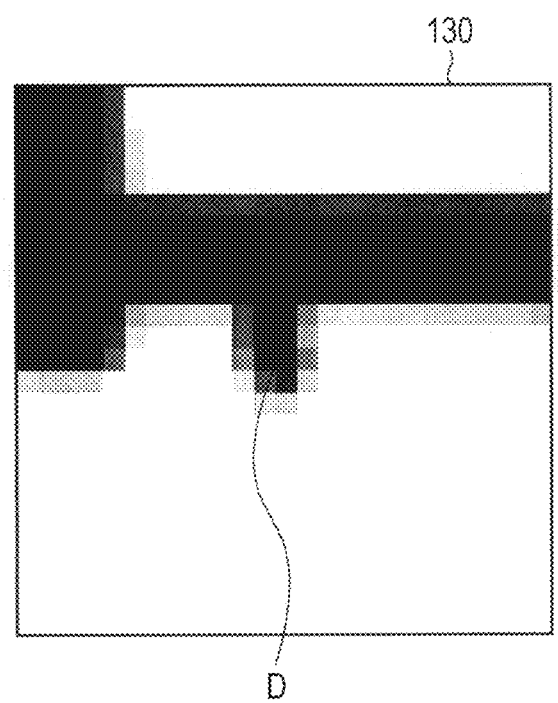
FIG. 11 shows an enlarged view of a defect region of the inspection target image shown in FIG. 9.
Figure 12:
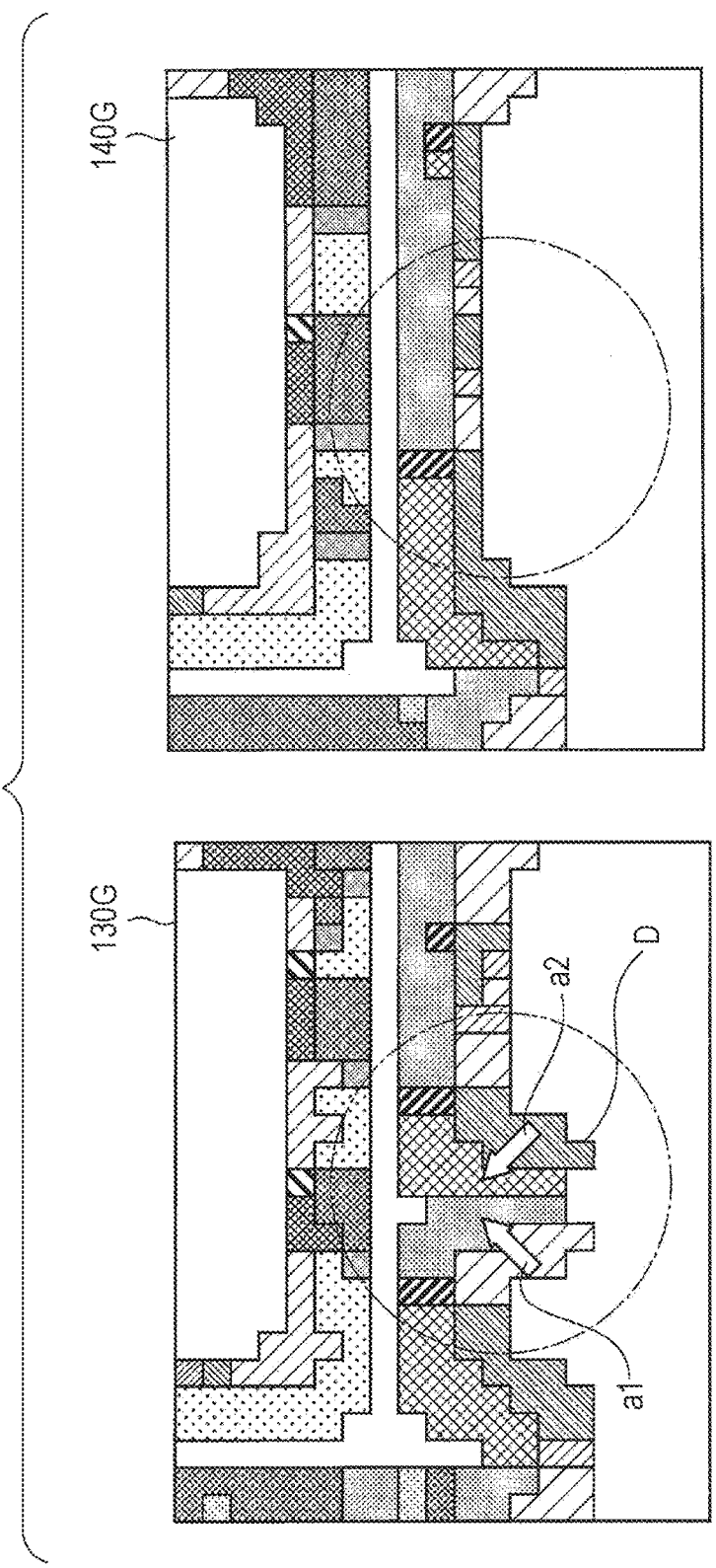
FIG. 12 shows an enlarged view of a defect region of the inspection target image in FIG. 10, and an enlarged view of the corresponding region of the reference image in FIG. 10.

FIG. 11 shows an enlarged view of the defect region D of the inspection target image 130 shown in FIG. 9. Further, FIG. 12 shows an enlarged view of the defect region D of the inspection target image 130G in FIG. 10, and an enlarged view of the corresponding region of the reference image 140G. As shown in the enlarged view of the inspection target image 130G in FIG. 12, the left-side portion of the defect region D of the inspection target image 130G is primarily indicated by a vector a1, and the right-side portion of the defect region D is primarily indicated by a vector a2. The vector a1 is a vector extending from the center (the target pixel) of the legend toward the upper right, and the vector a2 is a vector extending from the target pixel toward the upper left. That is, as indicated by dashed lines, edges having gradient directions toward the center of the defect region D are observed.

In the enlarged view of the reference image 140G, on the other hand, there is no indication of the above gradient directions in the region corresponding to the defect region D. Specifically, as a smudge (defect) is left on the character in the inspection target image 130G, large differences in edge direction are generated between the inspection target image 130G and the reference image 140G. Further, due to this defect, the size of the edge region (the length of the edge region in the gradient direction) of the inspection target image 130G is larger than the size of the edge region of the reference image 140G. From these facts, it is possible to detect the existence of the defect region D having a convex pixel value distribution (corresponding to the pixel value distribution E1 in FIG. 6) in the inspection target image 130. This defect region D is a true defect.

According to the first embodiment described above, it is possible to detect a defect while preventing false detection and a decrease in sensitivity, by taking into consideration the edge direction of each edge in a defect candidate region in the inspection target image.

By the conventional technique, a low threshold is set for defect determination in an edge region (S6 in FIG. 7), and therefore, sensitivity is lowered. In the above described first embodiment, on the other hand, the directions of edges in a defect candidate region in the inspection target image are used in determining a defect, and thus, false detection of a defect can be prevented. Accordingly, there is no need to switch thresholds depending on whether a defect candidate region in the inspection target image is located in the vicinity of an edge, and it is possible to detect a defect with high sensitivity, while preventing false detection of a defect in an edge portion of an image even with a high-sensitivity threshold, for example. This embodiment is particularly effective in a region in which minute edges exist at a high density, such as a character, and it is possible to accurately detect a smudge joined to an edge, for example. It is also possible to maintain the same precision for defects as that achieved with any conventional technique.

Second Embodiment

In a second embodiment, the magnitudes of edge gradients, as well as the directions of edges, are taken into consideration in determining a defect. The advantages of taking the magnitudes of edge gradients into consideration are described below.

Figure 13:
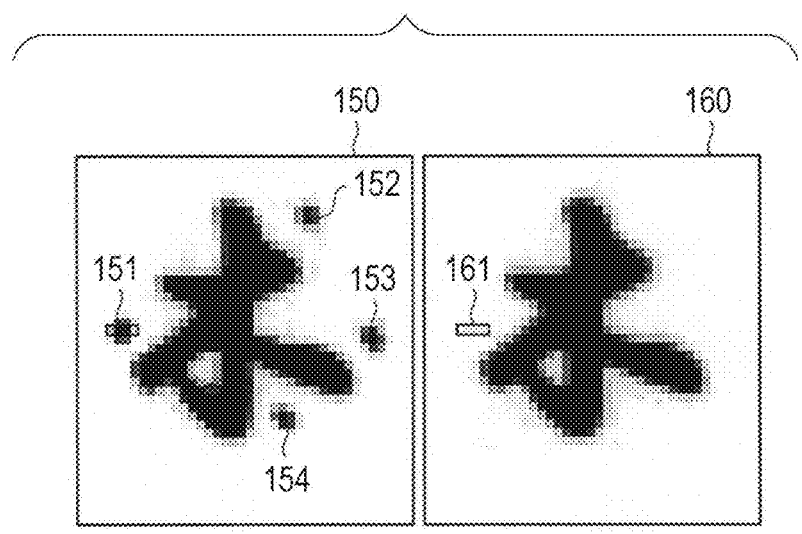
FIG. 13 is a diagram showing an example of an inspection target image and a reference image.

FIG. 13 is a diagram showing an example of an inspection target image and a reference image. As shown in FIG. 13, four smudges 151 through 154 as an example of defects exist around the Chinese character meaning "tree" in an inspection target image 150. The smudges 151 through 154 do not exist in a reference image 160.

Figure 14:
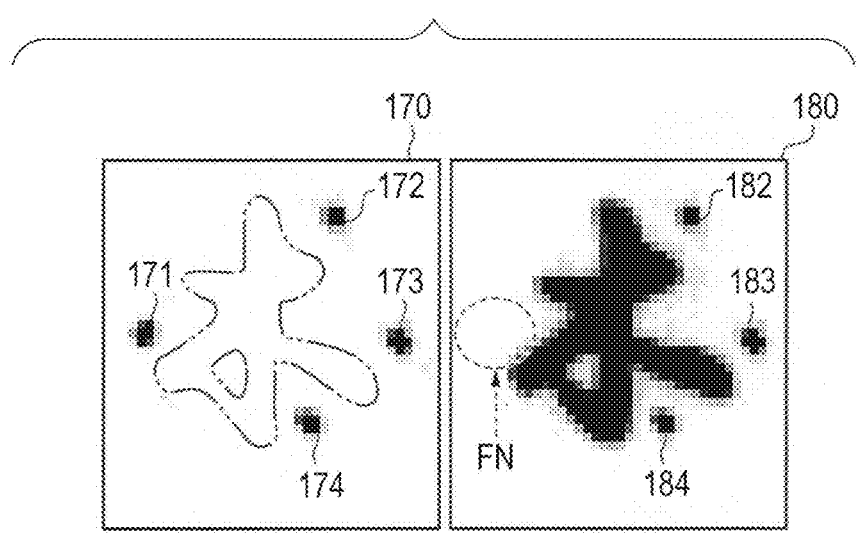
FIG. 14 is a diagram showing an example of a binarization result and a defect detection result of a difference image generated from the inspection target image and the reference image.
Figure 15A:
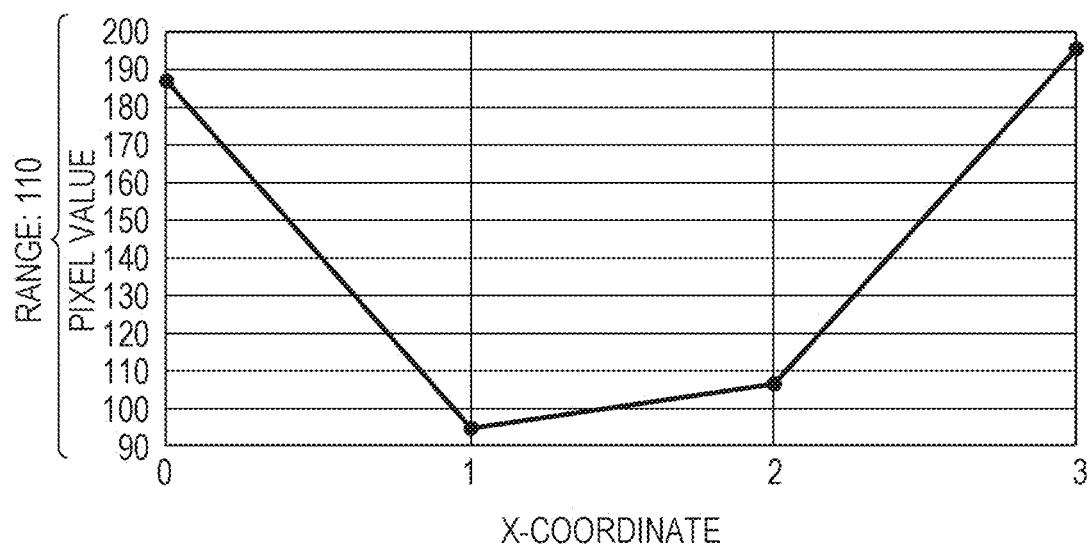
FIG. 15A and FIG. 15B are graphs showing changes in the pixel values of the inspection target image and the reference image in FIG. 13.
Figure 15B:
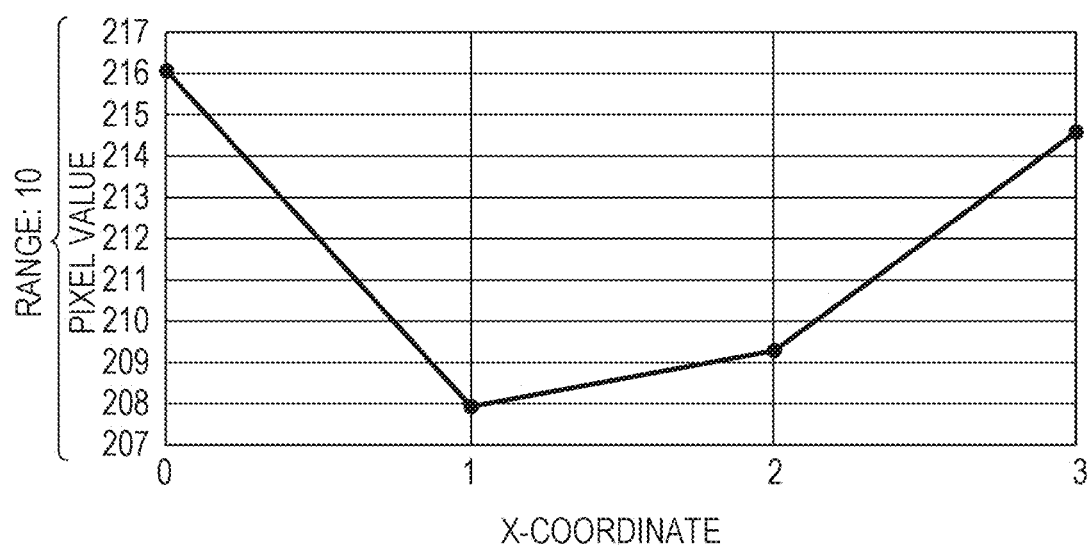

FIG. 14 is a diagram showing an example of a binarization result 170 (a binarized image) and a defect detection result 180 of a difference image generated from the inspection target image 150 and the reference image 160. The binarization result 170 should show only a difference image or defect candidate regions. In FIG. 15A and FIG. 15B, however, the character meaning "tree", which is the inspection target character, is indicated by double-dot-and-dashed lines, for ease of explanation. The defect detection result 180 shows defects (defect candidate regions determined to be true defects) superimposed on the inspection target image 150.

As shown on the left side in FIG. 14, defect candidate regions 171 through 174 corresponding to the four smudges 151 through 154 in the inspection target image 150 exist in the binarization result 170 of the difference image. In the defect detection result 180 on the right side in FIG. 14, the shown defects are three defects 182 through 184. The defects 182 through 184 correspond to the defect candidate regions 172 through 174 in the binarization result 170 of the difference image. That is, of the four defect candidate regions 171 through 174 existing in the binarization result 170 of the difference image, the defect candidate region 171 is deleted.

A false negative portion FN indicated by a dashed line in the defect detection result 180 is the portion in which the defect candidate region 171 was present. The smudge (the defect candidate region 171) that was detected at the stage of the binarization of the difference image is erased by the algorithm for defect determination based on edge directions.

In the description below, the reason that a defect candidate region is erroneously deleted by the algorithm for defect determination based on edge directions (gradient directions) is explained.

FIG. 15A and FIG. 15B are graphs showing changes in the pixel values of the respective pixels of the inspection target image and the reference image shown in FIG. 13. In each of FIG. 15A and FIG. 15B, the abscissa axis indicates the coordinates of the respective pixels, and the ordinate axis indicates the pixel values of the respective pixels. FIG. 15A is an inspection target image profile showing changes in the pixel values of the respective pixels in the region including the smudge 151 of the inspection target image 150. FIG. 15B is a reference image profile showing changes in the pixel values of the respective pixels in the region 161 located at the position corresponding to the smudge 151 in the reference image 160. Note that, while the range of pixel values in the inspection target image 150 in FIG. 15A is 110, the range of pixel values in the reference image 160 in FIG. 15B is 10.

When attention is drawn to the changes in the pixel values of the smudge 151 in the inspection target image 150, and the changes in the pixel values in the region 161 in the reference image 160 located at the position corresponding to the smudge 151, there is a difference in pixel value range between the inspection target image 150 and the reference image 160, but the pixel value magnitude relationships (the gradients of the graphs in FIG. 15A and FIG. 15B) are similar. As the directions of the edges in the target portion are the same between the inspection target image 150 and the reference image 160, it is considered that the defect determiner 115 has erroneously deleted the defect candidate region 171.

As described above, when defect determination is performed only on the basis of edge directions, edge directions might become the same as those of minute smudges or wrinkles or the like that dot not need to be detected from a recording medium such as a paper sheet, and a defect candidate region might be erroneously deleted in some cases as shown in FIG. 13 through FIG. 15B. To prevent such erroneous deletion of a defect candidate region, the second embodiment is designed to determine a defect by taking into consideration not only edge directions but also the magnitudes of edge gradients.

[Configuration of the Inspection Function]

Figure 16:
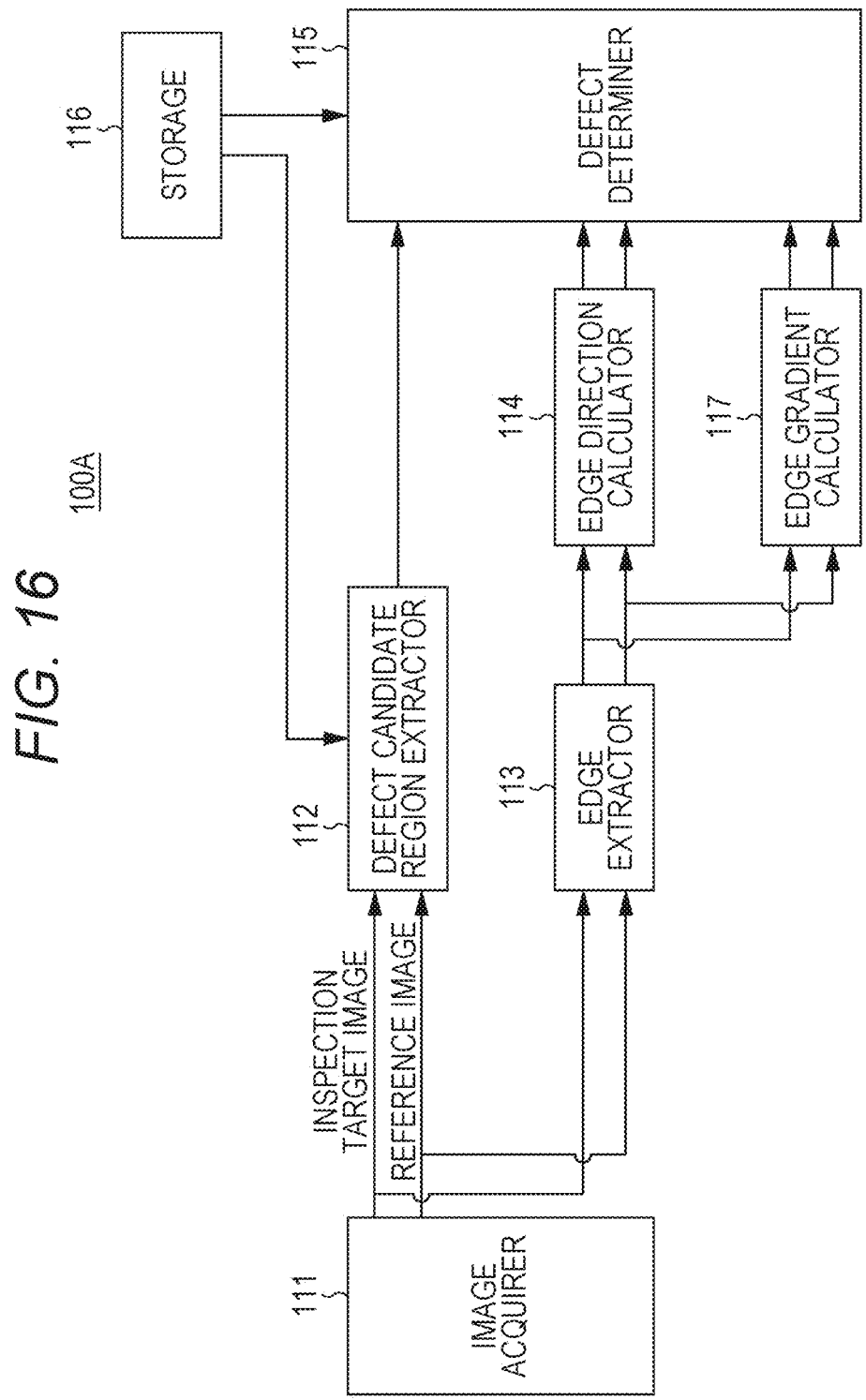
FIG. 16 is a block diagram showing an example configuration of an inspection function of an inspection device according to a second embodiment of the present invention.

FIG. 16 is a block diagram showing an example configuration of an inspection function of an inspection device 100A according to the second embodiment. The inspection device 100A differs from the inspection device 100 according to the first embodiment (see FIG. 4) in including an edge gradient calculator 117.

As shown in FIG. 16, the edge gradient calculator 117 is provided in parallel with the edge direction calculator 114 between the edge extractor 113 and the defect determiner 115. The edge extractor 113 outputs the results of edge extraction from the inspection target image and the reference image, to the edge direction calculator 114 and the edge gradient calculator 117. The edge gradient calculator 117 performs a process of calculating the magnitude of an edge gradient in the inspection target image and the magnitude of an edge gradient in the reference image, and outputs the calculation results to the defect determiner 115.

In a case where the difference in the edge gradient magnitude between the inspection target image and the reference image is equal to or larger than a second threshold, the defect determiner 115 determines that the defect candidate region extracted by the defect candidate region extractor 112 is a defect, even if the difference in the edge direction between the two images is smaller than the first threshold. The second threshold is stored in the storage 116.

[Inspection Process]

Figure 17:
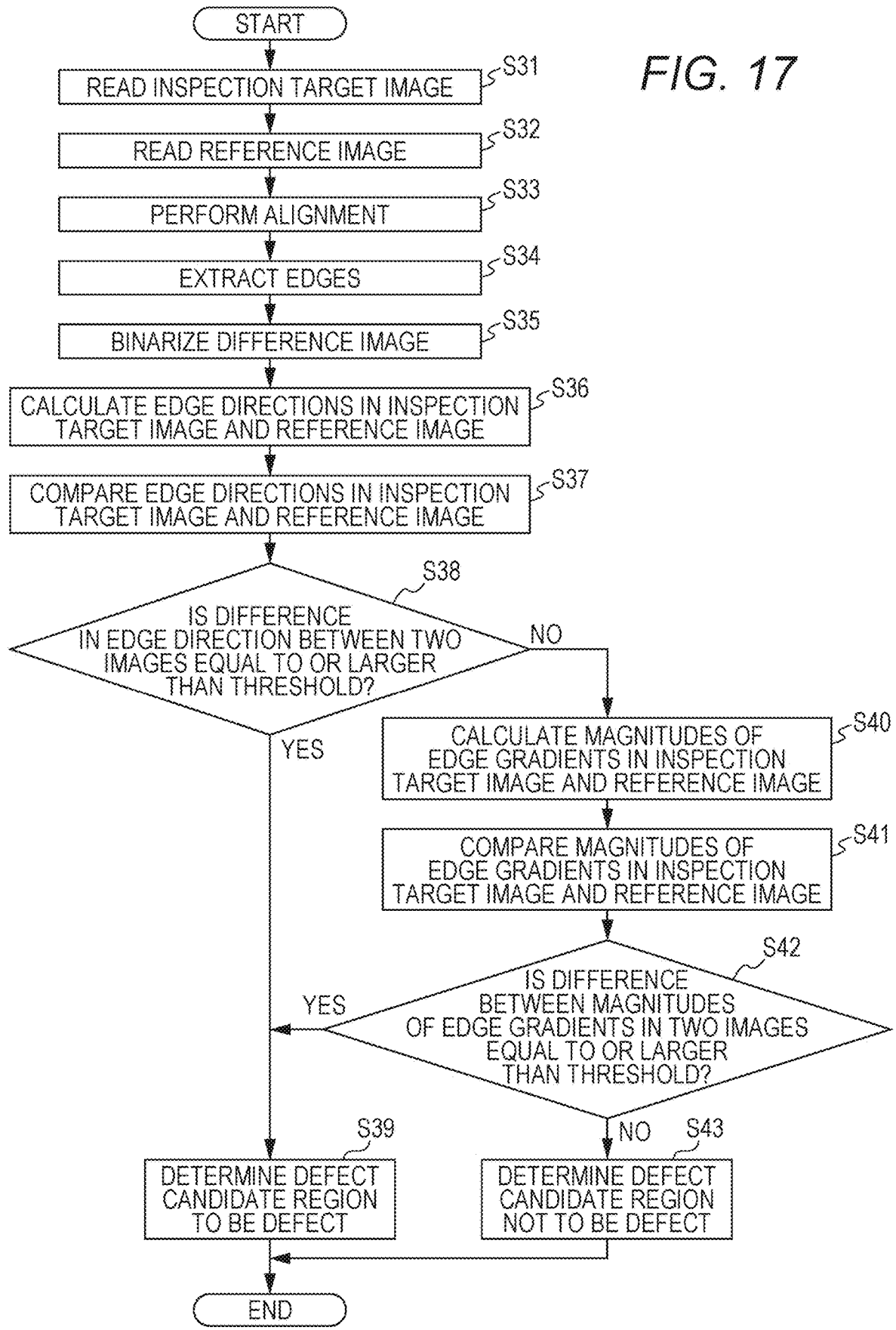
FIG. 17 is a flowchart showing exemplary procedures in an inspection process according to the second embodiment of the present invention.

FIG. 17 is a flowchart showing exemplary procedures in an inspection process according to the second embodiment. The procedures in steps S31 through S37 in FIG. 17 are the same as the procedures in steps S11 through S17 in FIG. 8, and therefore, detailed explanation thereof is not repeated herein.

After comparing the edge directions in the inspection target image and the reference image at the position corresponding to the defect candidate region in step S37, the defect determiner 115 determines whether the value of the difference in edge direction (a displacement angle) between the two images is equal to or greater than the first threshold (S38). If the value of the difference in edge direction (the displacement angle) between the two images is equal to or greater than the first threshold (YES in S38), the defect determiner 115 determines that the defect candidate region is a defect (S39).

If the defect determiner 115 determines that the value of the difference in edge direction (the displacement angle) between the inspection target image and the reference image is smaller than the first threshold (NO in S38), on the other hand, the edge gradient calculator 117 calculates the magnitudes of the respective edge gradients in the two images (S40). The process of calculating the magnitudes of the edge gradients in step S40 should be performed between step S34 (edge extraction) and step S41 (edge gradient magnitude comparison), and may be performed in parallel with the process of calculating the edge directions in step S36, for example.

The defect determiner 115 then compares the magnitudes of the gradients of the respective edges in the two images at the position corresponding to the defect candidate region (S41), and determines whether the value of the difference in magnitude between the respective edge gradients (the amount of displacement) is equal to or greater than the second threshold (S42).

If the value of the difference in the edge gradient magnitude between the inspection target image and the reference image is equal to or greater than the second threshold (YES in S42), the defect determiner 115 determines that the defect candidate region is a defect (S39). If the value of the difference between the respective edge gradients is smaller than the second threshold (NO in S42), the defect determiner 115 determines that the defect candidate region is not a defect (S43). After the procedures in step S39 or S43 is completed, the inspection process comes to an end.

[Example of a Determination Result]

Figure 18:
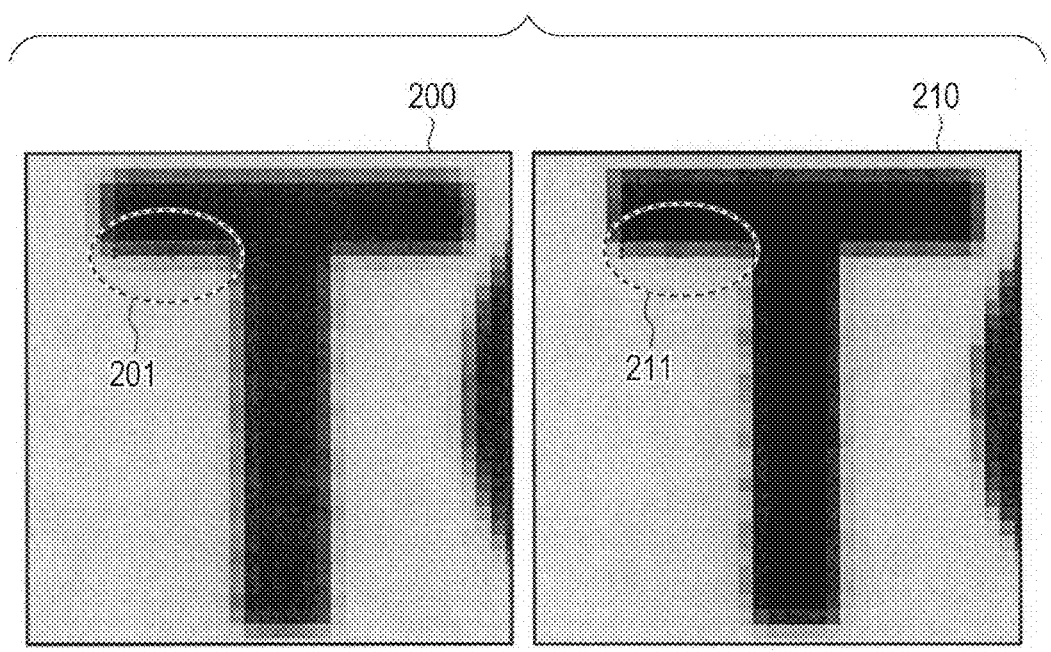
FIG. 18 is a diagram showing an example of an inspection target image and a reference image.
Figure 19:
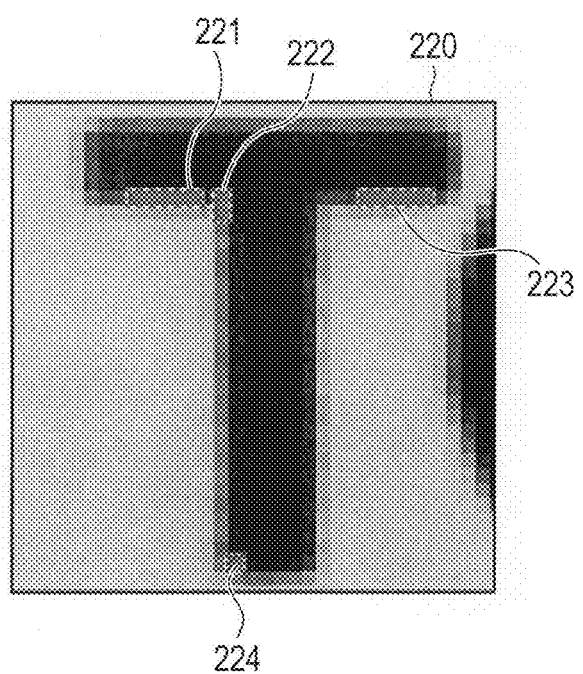
FIG. 19 is a diagram showing an example of a defect detection result based on a result of binarization of a difference image generated from the inspection target image and the reference image.

Referring now to FIG. 18 and FIG. 19, an example of the result of determination as to an inspection target image is described. FIG. 18 is a diagram showing an example of an inspection target image 200 and a reference image 210. The inspection target image 200 and the reference image 210 shown in FIG. 18 each show the letter "T" of the alphabet. In an edge region 201 indicated by a dashed line (the lower side of the horizontal stroke of "T") in the inspection target image 200, and an edge region 211 indicated by a dashed line in the reference image 210, there are no apparent differences in edge gradient and direction, even if there are differences between pixel values. Note that, as shown in FIG. 19 described later, there are other regions in the inspection target image 200 and the reference image 210 in which there are no apparent differences in edge gradient and direction even if there are differences between pixel values.

FIG. 19 is a diagram showing a defect detection result 220 based on a result of binarization of a difference image generated from the inspection target image 200 and the reference image 210. Note that, in the inspection target image 200, the letter "T" as the inspection target is shown for easier understanding.

In the defect detection result 220, four pixel regions 221 through 224 are shown. The pixel region 221 corresponds to the edge region 201 of the inspection target image 200 and the edge region 211 of the reference image 210. The pixel regions 221 through 224 are portions in which the pixel values of the corresponding edge regions of the inspection target image 200 and the reference image 210 are different. However, in the pixel regions 221 through 224, the pixel values of the corresponding edge regions of the inspection target image 200 and the reference image 210 are different, but the magnitudes and directions of the gradients in the corresponding portions are similar. Therefore, in a case where the inspection process according to this embodiment performed on the four pixel regions 221 through 224, these pixel regions 221 through 224 are deleted as erroneously detected regions from the defect candidate regions, and are not detected as defects.

According to the above described second embodiment, the magnitudes of edge gradients as well as edge directions in the inspection target image and the reference image at the position corresponding to a defect candidate region are taken into consideration in determining a defect, and thus, a defect can be detected more accurately. For example, in a case where the value of the difference between edge gradients in the inspection target image and the reference image is equal to or greater than the second threshold, the region including the target edge (a defect candidate region) is determined to be a defect, even if the directions of edges in the two images are the same. The defect candidate region determined to be a defect is not deleted from the defect detection result and is shown as a defect.

Third Embodiment

The algorithms for the inspection processes in the first embodiment and the second embodiment described above are effective in inspecting an edge region or a region near an edge (in the vicinity of an edge). In view of this, a third embodiment is designed to detect a defect using the algorithms for the inspection processes in the respective embodiments described above in a case where the position corresponding to a defect candidate region in the reference image is in the vicinity of an edge in the reference image.

[Configuration of the Inspection Function]

Figure 20:
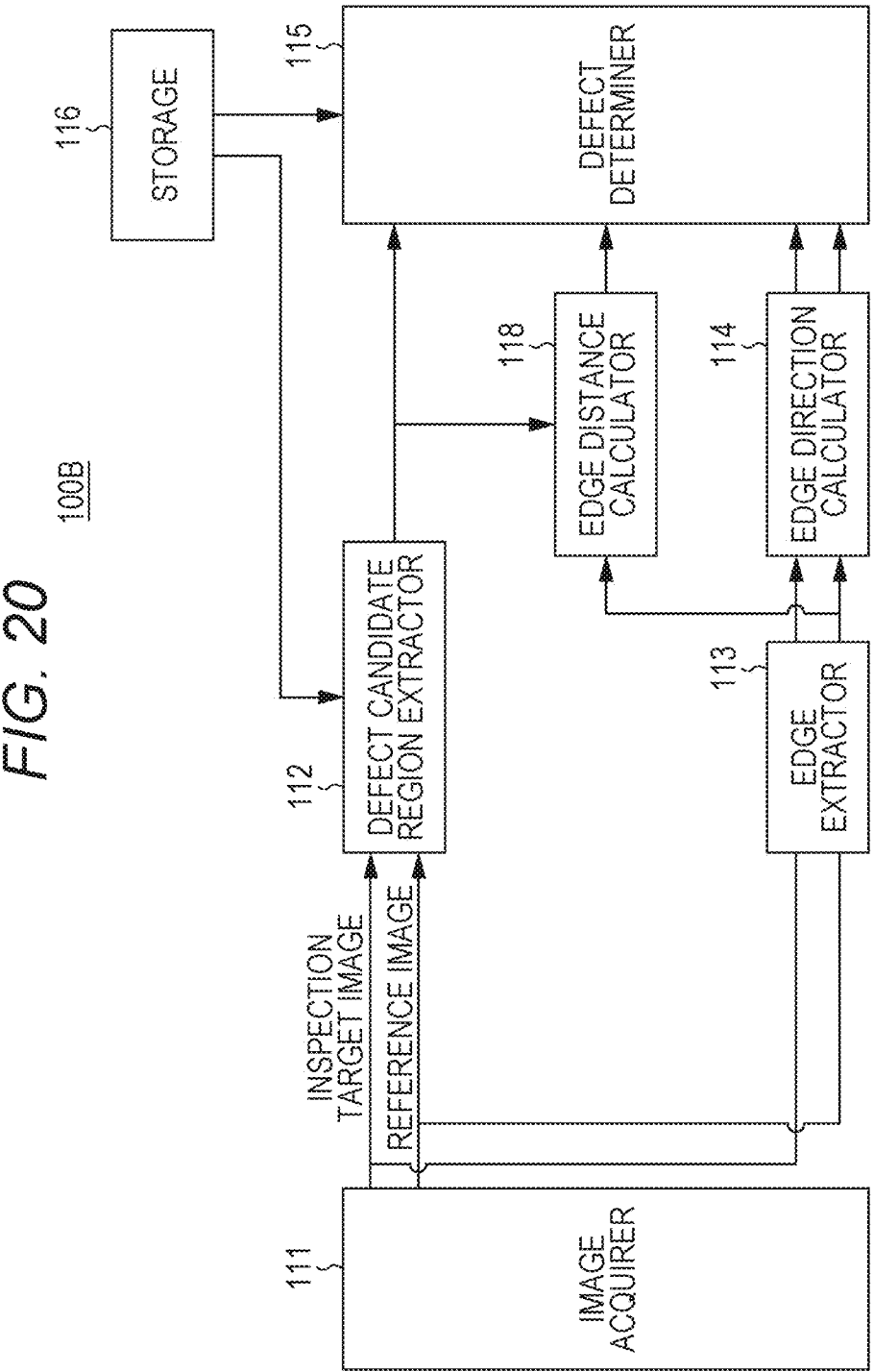
FIG. 20 is a block diagram showing an example configuration of an inspection function of an inspection device according to a third embodiment of the present invention.

FIG. 20 is a block diagram showing an example configuration of an inspection function of an inspection device 100B according to the third embodiment. The inspection device 100B differs from the inspection device 100 according to the first embodiment (see FIG. 4) in including an edge distance calculator 118.

As shown in FIG. 20, the edge distance calculator 118 receives information about a defect candidate region extracted by the defect candidate region extractor 112 and information on an edge in the reference image extracted by the edge extractor 113. The edge distance calculator 118 then performs a process of calculating the distance from the position corresponding to the defect candidate region to the nearest edge in the reference image, the defect candidate region having been extracted by the defect candidate region extractor 112. The edge distance calculator 118 outputs the calculation result to the defect determiner 115.

In a case where the distance from the position corresponding to the defect candidate region to the nearest edge in the reference image is equal to or greater than a third threshold, the defect determiner 115 does not delete the defect candidate region from the defect detection result. That is, in a case where the defect candidate region of the inspection target is far from the edge in the reference image, the defect determiner 115 determines the defect candidate region to be a defect, and outputs the determination result. In a case where the defect candidate region of the inspection target is in contact with or close to the edge in the reference image, on the other hand, the defect determiner 115 performs the determination according to the first embodiment for the defect candidate region. The third threshold is stored in the storage 116.

[Inspection Process]

Figure 21:
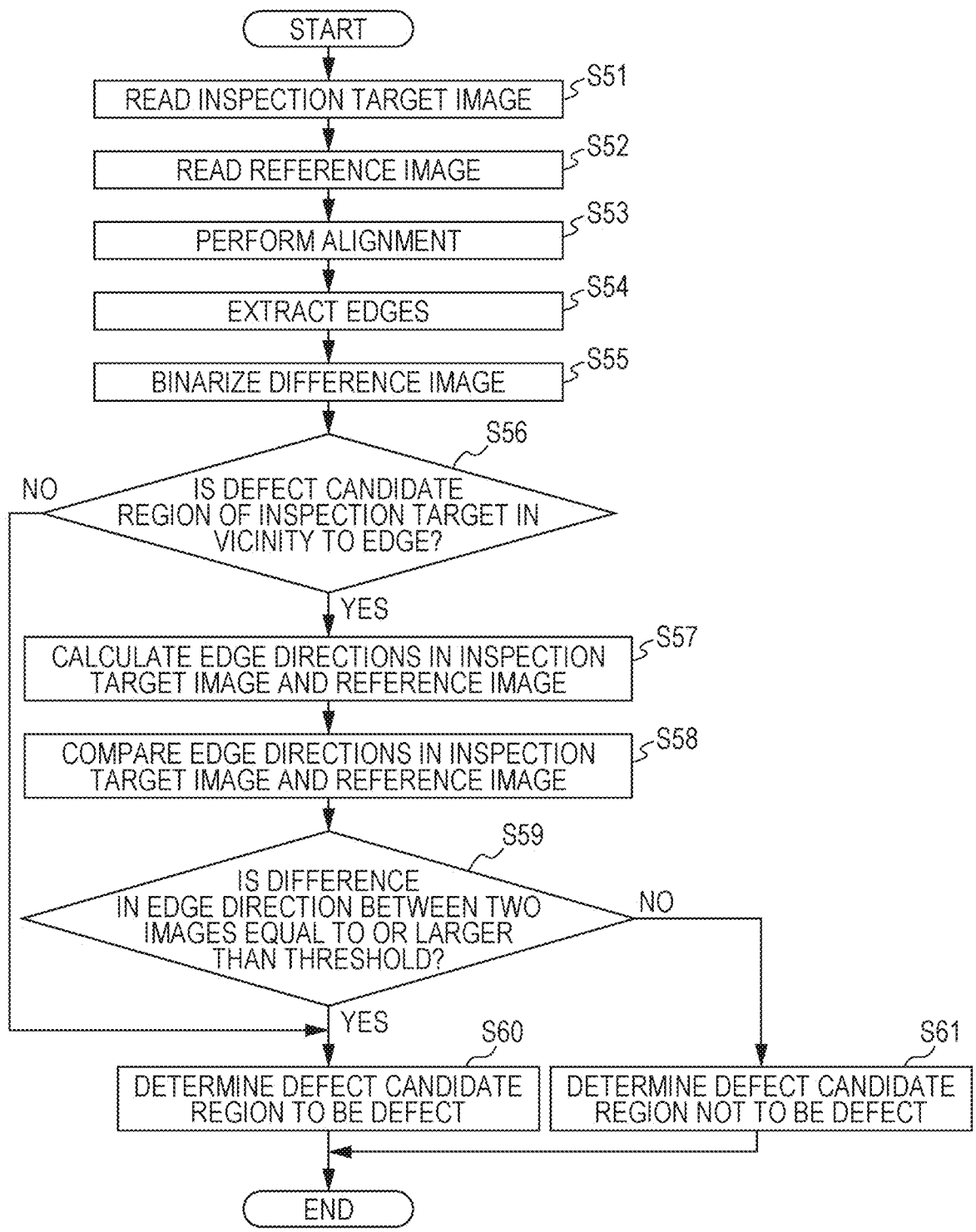
FIG. 21 is a flowchart showing exemplary procedures in an inspection process according to the third embodiment of the present invention.

FIG. 21 is a flowchart showing exemplary procedures in an inspection process according to the third embodiment. The procedures in steps S51 through S55 in FIG. 21 are the same as the procedures in steps S11 through S15 in FIG. 8, and therefore, detailed explanation thereof is not repeated herein.

After the procedures in steps S51 through S55 are carried out to extract edges from the inspection target image and the reference image and binarize the difference image on the basis of the two images, the defect determiner 115 determines whether the position corresponding to the defect candidate region of the inspection target in the reference image is in the vicinity of the edge in the reference image (S56). To determine whether the position corresponding to the defect candidate region of the inspection target is in the vicinity of the edge in the reference image, the defect determiner 115 compares the distance from the position corresponding to the defect candidate region in the reference image to the nearest edge in the image with the third threshold. If the defect determiner 115 determines that the position corresponding to the defect candidate region is not in the vicinity of the edge in the reference image (NO in S56), the defect determiner 115 determines the defect candidate region to be a defect, and does not delete the defect candidate region from the defect detection result (S60).

If the defect determiner 115 determines that the position corresponding to the defect candidate region is in the vicinity of the edge in the reference image (YES in S56), the process moves on to step S57. The procedures in steps S57 through S61 are the same as the procedures in steps S16 through S20 in FIG. 8, and therefore, detailed explanation thereof is not repeated herein.

The flowchart in FIG. 21 corresponds to the algorithm for the inspection process according to the first embodiment, but may of course correspond to the algorithm for the inspection process according to the second embodiment.

According to the third embodiment described above, in a case where a defect candidate region is in the vicinity of an edge in the reference image, the algorithm for the inspection process according to the first embodiment and the second embodiment is executed. Conversely, in a case where a defect candidate region is not in the vicinity of an edge in the reference image, a conventional inspection process is performed. As described above, the algorithm for the inspection process according to the first embodiment and the second embodiment is executed only in a case where the position corresponding to a defect candidate region is in the vicinity of an edge in the reference image. Thus, it is possible to efficiently inspect the inspection target image.

<Modifications>

Modifications of the above described embodiments are now described. In the above-described embodiments, the inspection device 100 has been described as a hardware environment in which the inspection function operates. However, the present invention is not limited to this. For example, an image processing apparatus as shown in FIG. 22 may be used.

Figure 22:
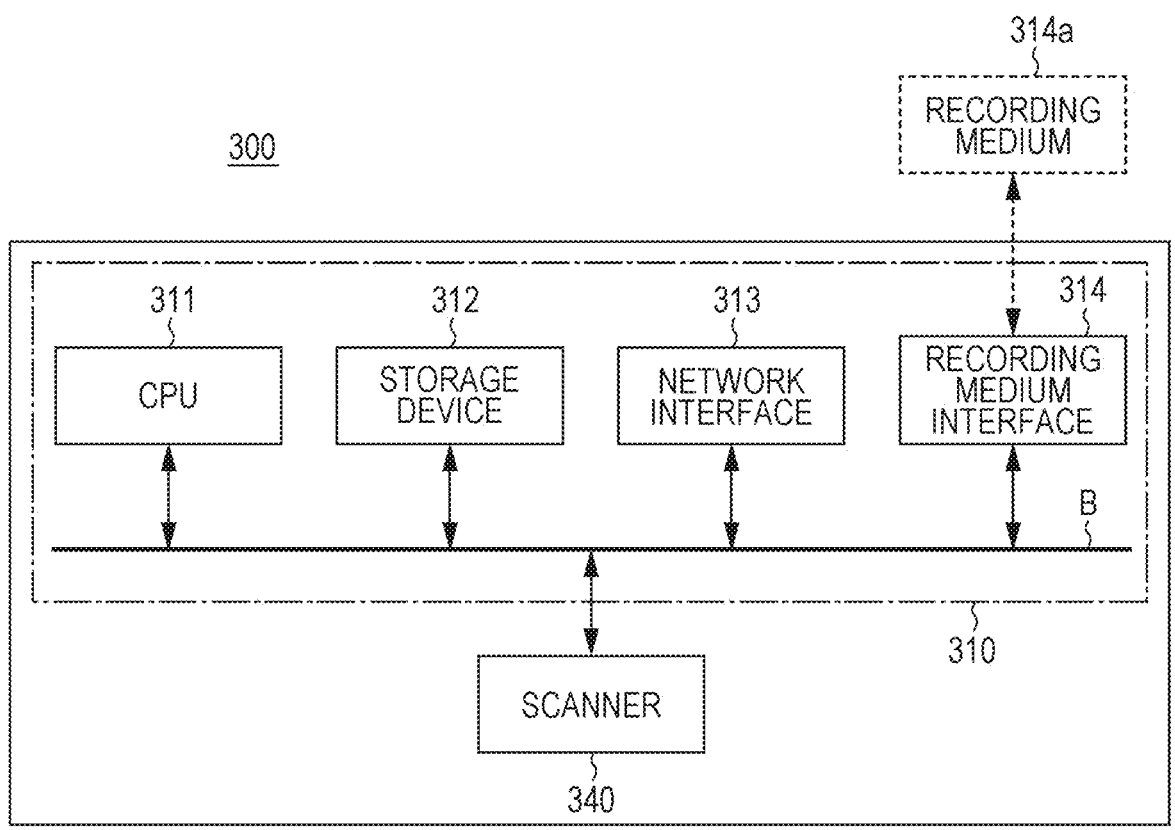
FIG. 22 is a block diagram showing an example hardware configuration of an image processing apparatus having an inspection function.

FIG. 22 is a block diagram showing an example hardware configuration of an image processing apparatus 300 having an inspection function. As shown in FIG. 22, the image processing apparatus 300 includes a controller 310 and a scanner 340, which are connected to each other by a bus B.

The scanner 340 is a reading device that optically reads a print piece, and generates a read image. The controller 310 is a control board that includes a CPU 311, a storage device 312, a network interface 313, and a recording medium interface 314, which are connected to one another by the bus B.

The storage device 312 is a device that includes a RAM, a ROM, and/or an HDD, and stores and holds various programs and data. The CPU 311 is an arithmetic device that reads a program and data from the ROM or the HDD into a RAM (memory), and performs processing (performs processing of the read program and data), to achieve control and installation functions of the entire apparatus. Accordingly, the inspection function described above is realized by the CPU 311 executing a program read into the RAM.

The network interface 313 is an interface that connects the image processing apparatus 300 to a data transmission path N. With this configuration, the image processing apparatus 300 can perform data communication with another device having a communication function via the network interface 313. The recording medium interface 314 is an interface with a recording medium 314a that is an external storage device. The recording medium 314a may be an SD memory card or a USB memory, for example. With this configuration, the image processing apparatus 300 can perform reading and/or writing on the recording medium 314a via the recording medium interface 314.

As described above, having the above configuration, the image processing apparatus 300 can provide a printed matter inspection service without any external assistance.

Figure 23:
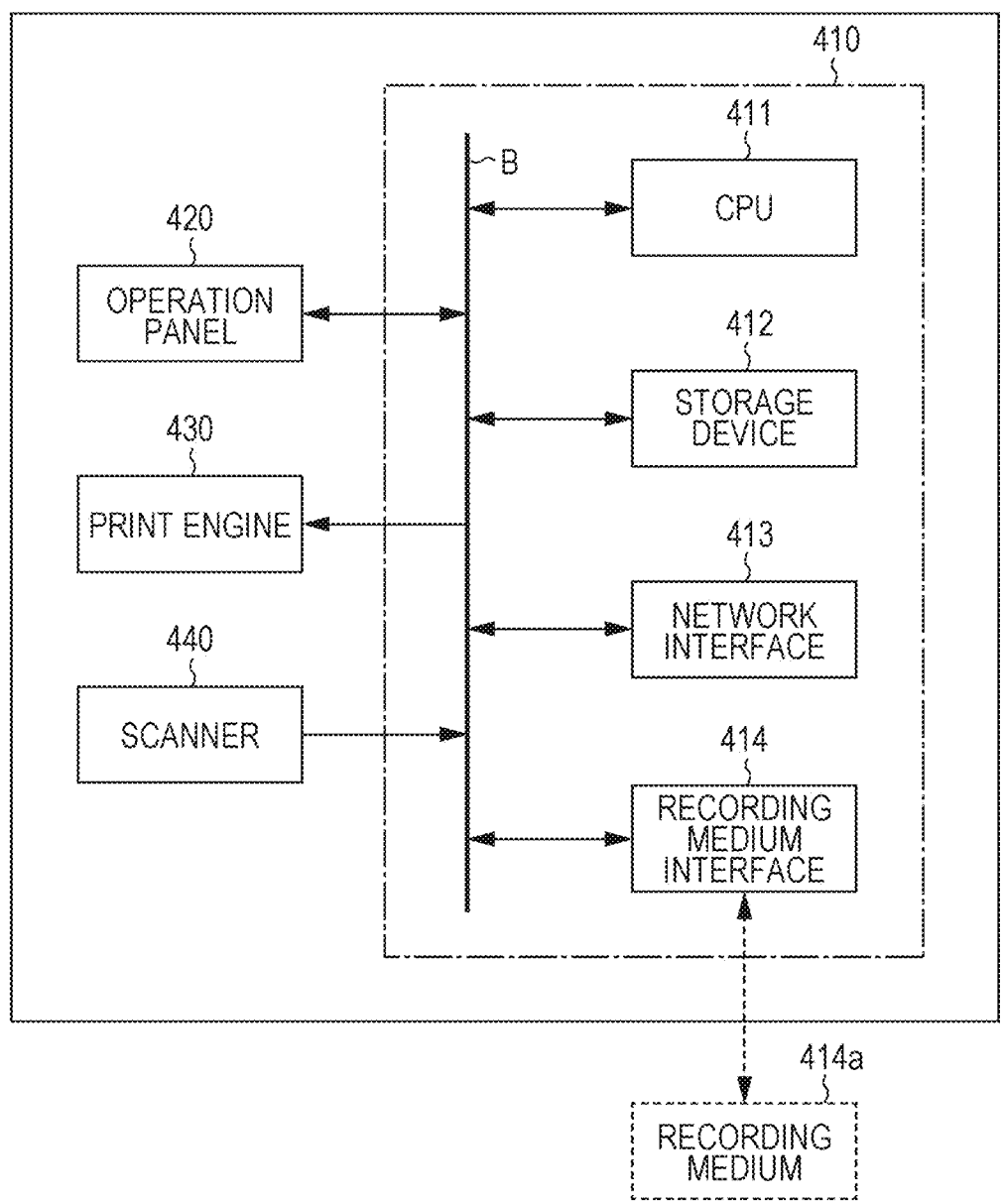
FIG. 23 is a block diagram showing an example hardware configuration of an image forming apparatus having an inspection function.

Alternatively, the inspection device may be an image forming apparatus such as a multifunction peripheral (MFP) as shown in FIG. 23, for example.

FIG. 23 is a block diagram showing an example hardware configuration of an image forming apparatus 400 having an inspection function. As shown in FIG. 23, the image forming apparatus 400 includes a controller 410, an operation panel 420, a print engine 430, and a scanner 440, which are connected to one another by a bus B.

The operation panel 420 is an input/display device that includes an input unit and a display unit, and provides various kinds of information such as device information to the user and accepts various user operations such as operation settings and operation instructions. The print engine 430 is a printing device that includes an image forming member and forms an output image on a paper sheet. Examples of a method of forming an output image include an electrophotographic process and an inkjet method.

The controller 410 is a control board that includes a CPU 411, a storage device 412, a network interface 413, and a recording medium interface 414, which are connected to one another by the bus B.

The storage device 412 is a device that includes a RAM, a ROM, and an HDD, and stores and/or holds various programs and data. The CPU 411 is an arithmetic device that reads a program and data from the ROM or the HDD into a RAM, and performs processing (performs processing of the program and data read from the storage device), to achieve control and installation functions of the entire apparatus. Accordingly, the inspection function described above is realized by the CPU 411 executing a program read into the RAM.

The network interface 413 is an interface that connects the image forming apparatus 400 to a data transmission path N. With this configuration, the image forming apparatus 400 can perform data communication with another device having a communication function via the network interface 413. The recording medium interface 414 is an interface with a recording medium 414a that is an external storage device. The recording medium 414a may be an SD memory card or a USB memory, for example. With this configuration, the image forming apparatus 400 can perform reading and/or writing on the recording medium 414a via the recording medium interface 414.

As described above, having the above configuration, the image forming apparatus 400 can provide a printed matter inspection service without any external assistance, like the image processing apparatus 300.

Further, in the first through third embodiments described above, the inspection system 1 in which the scanner 120 shown in FIG. 2 and the inspection device 100, 100A, or 100B are connected has been described. However, the present invention is not limited to this. For example, the inspection device 100 may be connected to the image processing apparatus 300 or the image forming apparatus 400. In this case, the inspection target image is transmitted from the image processing apparatus 300 or the image forming apparatus 400 to the inspection device 100.

Furthermore, the present invention is not limited to the above described embodiments, and various other applications and modifications may of course be made to them without departing from the scope of the present invention as set forth in the claims.

For example, for easier understanding of the present invention, the configurations of apparatuses and systems have been specifically and explicitly described in the above embodiments. However, not all the components described above should be included in an apparatus or a system. It is also possible to replace one of the components of one embodiment with a component of another embodiment. Further, it is also possible to add a component of one embodiment to the components of another embodiment. It is also possible to add, delete, or replace some of the components of each of the above embodiments to/from/with other components.

Further, some or all of the above components, functions, processing units, and the like may be realized by hardware formed with an integrated circuit or the like, for example. Alternatively, the above components, functions, and the like may be realized by software in which a processor interprets and executes a program for achieving the respective functions.

Although embodiments of the present invention have been described and illustrated in detail, the disclosed embodiments are made for purposes of illustration and example only and not limitation. The scope of the present invention should be interpreted by terms of the appended claims.

What is claimed is:

1. An inspection device comprising:
   an image acquirer that acquires an inspection target image, the inspection target image being a read image obtained by reading an inspection side of a recording material on which an output image is formed;
   an edge extractor that extracts an edge from each of the inspection target image and a reference image to be used in inspecting the output image;
   a defect candidate region extractor that extracts a defect candidate region having a possibility of a defect by comparing the inspection target image with the reference image;
   an edge direction calculator that calculates a direction of the edge in the inspection target image and a direction of the edge in the reference image; and
   a defect determiner that determines whether the defect candidate region is a defect, on a basis of the direction of the edge in the inspection target image and the direction of the edge in the reference image at a position corresponding to the defect candidate region.

2. The inspection device according to claim 1, wherein the defect determiner compares the direction of the edge in the inspection target image with the direction of the edge in the reference image, and, when a difference between the directions of the edges is equal to or larger than a first threshold, determines the defect candidate region to be a defect.

3. The inspection device according to claim 2, further comprising
   an edge gradient calculator that calculates a magnitude of a gradient of the edge in the inspection target image and a magnitude of a gradient of the edge in the reference image at the position corresponding to the defect candidate region,
   wherein, when a difference between the magnitudes of the gradients of both edges is equal to or larger than a second threshold, the defect determiner determines the defect candidate region to be a defect even when the difference between the directions of the edges in the inspection target image and the reference image is smaller than the first threshold.

4. The inspection device according to claim 1, further comprising
   an edge distance calculator that calculates a distance from the position corresponding to the defect candidate region to the nearest edge in the reference image,
   wherein, when the distance is equal to or greater than a third threshold, the defect determiner determines the defect candidate region to be a defect.

5. An image forming apparatus comprising:
   an image former that forms an output image on a recording material;
   an image acquirer that acquires an inspection target image, the inspection target image being a read image obtained by reading an inspection side of the recording material on which the output image is formed;
   an edge extractor that extracts an edge from each of the inspection target image and a reference image to be used in inspecting the output image;
   a defect candidate region extractor that extracts a defect candidate region having a possibility of a defect by comparing the inspection target image with the reference image;
   an edge direction calculator that calculates a direction of the edge in the inspection target image and a direction of the edge in the reference image; and
   a defect determiner that determines whether the defect candidate region is a defect, on a basis of the direction of the edge in the inspection target image and the direction of the edge in the reference image at a position corresponding to the defect candidate region.

6. An inspection method comprising:
   acquiring an inspection target image, the inspection target image being a read image obtained by reading an inspection side of a recording material on which an output image is formed;
   extracting an edge from each of the inspection target image and a reference image to be used in inspecting the output image;
   extracting a defect candidate region having a possibility of a defect by comparing the inspection target image with the reference image;
   calculating a direction of the edge in the inspection target image and a direction of the edge in the reference image; and
   determining whether the defect candidate region is a defect, on a basis of the direction of the edge in the inspection target image and the direction of the edge in the reference image at a position corresponding to the defect candidate region.

* * * * *